(12) United States Patent
Sethuramalingam et al.

(10) Patent No.: US 10,659,520 B1
(45) Date of Patent: May 19, 2020

(54) VIRTUAL DISK IMPORTATION

(71) Applicant: AMAZON TECHNOLOGIES, INC., Reno, NV (US)

(72) Inventors: Ekanth Sethuramalingam, Milpitas, CA (US); Venkata Satya Siva Kumar Balaga, Fremont, CA (US); Karthikeyan Natarajan, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 120 days.

(21) Appl. No.: 14/788,125

(22) Filed: Jun. 30, 2015

(51) Int. Cl.
*G06F 15/16* (2006.01)
*H04L 29/08* (2006.01)
*G06F 9/4401* (2018.01)

(52) U.S. Cl.
CPC ............ *H04L 67/06* (2013.01); *G06F 9/4401* (2013.01)

(58) Field of Classification Search
CPC ...................................................... H04L 67/06
USPC ......................................................... 709/217
See application file for complete search history.

(56) References Cited

U.S. PATENT DOCUMENTS

| | | | |
|---|---|---|---|
| 8,761,579 B2 | 6/2014 | Nakao | |
| 2005/0163483 A1* | 7/2005 | Rassool | G06K 9/00711 386/257 |
| 2009/0140056 A1* | 6/2009 | Leen | F24F 11/0086 236/49.3 |
| 2010/0162400 A1* | 6/2010 | Feeney | G06F 21/563 726/24 |
| 2011/0055298 A1* | 3/2011 | Wade | G06F 11/1435 707/827 |
| 2012/0070126 A1* | 3/2012 | Nakao | H04N 21/235 386/248 |
| 2014/0096135 A1* | 4/2014 | Kundu | G06F 9/455 718/1 |
| 2014/0109072 A1* | 4/2014 | Lang | G06F 8/52 717/168 |

(Continued)

OTHER PUBLICATIONS

Deutsch, "DEFLATE Compressed Data Format Specification version 1.3," RFC 1951, Network Working Group, Request for Comments 1951, May 1996, https://tools.ietf.org/html/rfc1951, 17 pages.

*Primary Examiner* — Brian Whipple
*Assistant Examiner* — Hannah S Wang
(74) *Attorney, Agent, or Firm* — Davis Wright Tremaine LLP

(57) ABSTRACT

Various systems and processes may be used for virtual disk importation. In particular implementations, systems and processes for virtual disk importation may include the ability to receive a request from a customer of a service provider network to import a virtual disk, which is accessible over a communication network, into the service provider network. The systems and processes may also include the ability to download a portion of a virtual disk file corresponding to the virtual disk, determine the type of the virtual disk by analyzing the downloaded portion, and determine the size of the virtual disk by analyzing the downloaded portion. The systems and processes may further include the ability to determine whether the virtual disk is supported by the service provider network based on the determined type of the virtual disk and download the virtual disk if the virtual disk is supported by the service provider network.

22 Claims, 10 Drawing Sheets

(56) References Cited

U.S. PATENT DOCUMENTS

| | | | |
|---|---|---|---|
| 2014/0115098 A1* | 4/2014 | Reich | H04N 21/4334 709/217 |
| 2015/0039875 A1* | 2/2015 | Di Cocco | G06F 9/4416 713/2 |
| 2015/0244802 A1* | 8/2015 | Simoncelli | G06F 9/45558 709/219 |
| 2016/0364257 A1* | 12/2016 | Graf | G06F 3/0683 |

* cited by examiner

VIRTUAL DISK IMPORTATION

BACKGROUND

Some network-based computing service providers allow customers to purchase and utilize computer resources, such as virtual machine instances, on a permanent or as-needed basis. In addition to virtual machine instances, such computing service providers typically allow customers to purchase and utilize other types of computer resources. For example, customers might be permitted to purchase access to and use file and block data storage resources, database resources, networking resources, and other types of computer resources. Utilizing these computer resources as building blocks, customers of such a network-based computing service provider can create custom solutions that provide various types of functionality, such as application hosting, backup and storage, content delivery, World Wide Web ("Web") hosting, enterprise information technology ("IT") solutions, database services, and others.

When requesting certain types of computer resources, such as virtual machine instances, customers of network-based service providers such as those described above are typically able to specify some generic details about the actual hardware and software platform that is allocated to provide the computer resources. For example, in the case of virtual machine instances, a customer might be permitted to specify the desired amount of processing memory, the desired level of processing capability, and a desired amount of storage. The network-based computing service then selects a particular hardware platform, such as a particular server computer, to utilize to instantiate the virtual machine requested by the customer.

DETAILED DESCRIPTION

Figure 1:
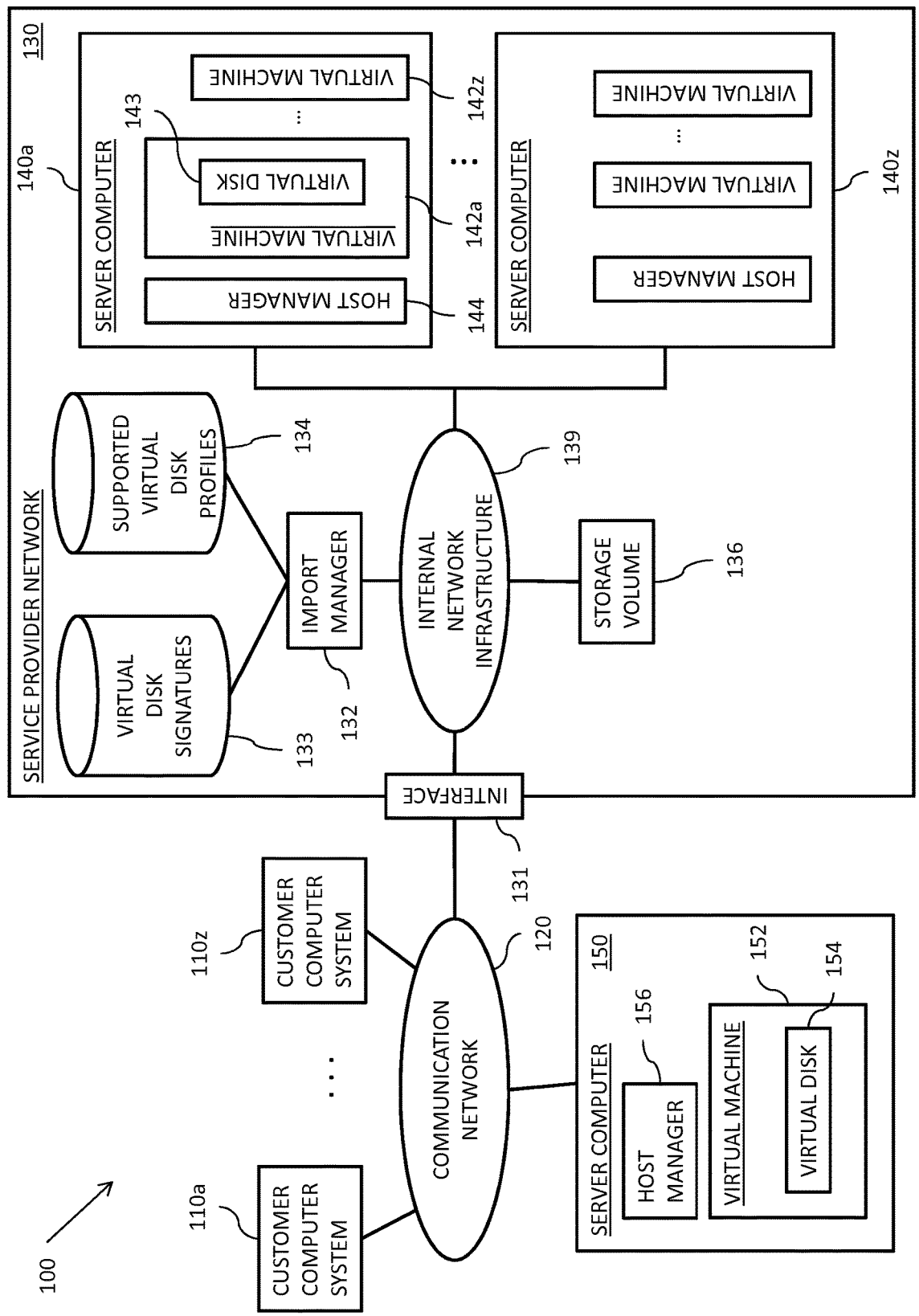
FIG. 1 is a block diagram illustrating selected components of an example system for importing virtual disks.

The following describes systems, processes, and techniques for virtual disk importation. Virtual disks contain the underlying software and/or data for virtual machines to operate. Virtual machines are typically set up in on one type of computing platform, which is maintained by a specific service provider. Due to cost, service levels, and a variety of other factors, the owner of a virtual machine may wish to implement the virtual machine on the computing platform of another service provider. Unfortunately, the platforms of different service providers typically have different underlying technology and processes and, hence, do not implement all types of virtual machines. Moreover, it is sometimes difficult for the owners of virtual machines to understand the intricacies of their virtual machines and the intricacies of the service provider platforms. Thus, attempting to move a virtual machine from one service provider platform to another service providers platform can be quite challenging for a customer.

The various mechanisms disclosed herein for virtual disk importation may operate in conjunction with a network-based distributed computing environment operated by a service provider (which may be referred to herein as a "service provider network"), through which customers can purchase and utilize computer resources such as instances, data storage resources, database resources, networking resources, and other types of computer resources on a permanent or as-needed basis. As one particular example, a user may request an instance of a virtual machine (e.g., a virtual machine instance or an instance that runs directly on hardware), and a server computer can be selected to host an instance of the machine image (i.e., run the instance). The instance may be allocated all or a portion of the server computer's processing power, memory, storage, and networking bandwidth. Because the requestor does not actually have his own dedicated computer but only a logical partition of another computer (i.e., the server computer), the machine is termed a "virtual machine," although it does in fact have physical processors, memory, storage, and/or networking.

The service provider operating the service provider network may charge a fee for providing the computer resources, and in this case, the requestor may be considered a customer of the service provider. The service provider might also utilize various purchasing models to determine how much to charge the customer for the use of computer resources. As mentioned above, customers of such a service provider can utilize the computer resources as building blocks to create custom solutions that provide various types of functionality, such as application hosting, backup and storage, content delivery, Web hosting, enterprise IT solutions, database services, and others.

To assist a customer in virtual disk importation, in certain implementations, a service provider network may allow a customer to specify a virtual disk to be imported into the service provider network. The virtual disk may be on a computing platform that is accessible over a communication network (e.g., the Internet). The service provider network may download a portion of the virtual disk to determine whether the virtual disk to be imported is supported by the service provider network. Thus, the acceptability of the virtual disk may be determined without having to download the entire virtual disk, which can be a costly and time-consuming process.

In certain implementations, the service provider network may, for example, download one or more small portions (e.g., a header and/or a footer) of the virtual disk. A header for example, may only occupy a few hundred bytes while a virtual disk may occupy a few terabytes (e.g., ten trillion times larger than the header). Based on this small portion, the service provider network may determine the type of the virtual disk, the format of the virtual disk, the size the virtual disk, the integrity of the virtual disk, and/or the validity of the virtual disk. Using this information, the service provider network may determine whether the virtual disk is supported by the service provider network and download the entire virtual disk if it is supported.

Once the virtual disk has been downloaded, the service provider network may check whether the virtual disk is functioning properly. For example, the service provider network may start the virtual disk and determine whether it is possible to read and/or store information on the virtual disk. If the virtual disk is functioning properly, the service provider network may make the virtual disk available for the customer.

In certain implementations, a virtual disk may actually specified for import include a number of virtual disks. The service provider network can determine whether there are multiple virtual disks to be downloaded and perform the above-mentioned analysis (e.g., disk type, format type, validity, integrity, etc.) for the disks. This analysis may be performed before any of the disks are downloaded in their entirety so that valuable will resources are not wasted if any of the disks is not acceptable.

The following will begin with an example operating environment for importing virtual disks. After that, example operating procedures that may be implemented in various portions of the web services platform to effectuate the virtual disk importation are described.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, tablet computing devices, special-purposed hardware devices, network appliances, and the like. As mentioned briefly above, the embodiments described herein may be practiced in distributed computing environments, where tasks may be performed by remote computing devices that are linked through a communications network. In a distributed computing environment, program modules may be located in both local and remote memory storage devices.

FIG. 1 illustrates selected components of an example system 100 for importing virtual disks. At a high level, system 100 includes a number of customer computer systems 110 that can send requests for computer resources (e.g., virtual machines) over a communication network 120 to a service provider network 130, which provides the computer resources. Service provider network 130 may allow customers to purchase and utilize computer resources (which might also be referred to herein as "resources"), such as virtual machine instances (which might also be referred to herein as "virtual machines" or "instances"), networking resources, storage resources, or other types of computer resources, from a service provider that operates the service provider network 130. These resources may be purchased on a permanent or as-needed basis. More detail about the operating environment, including more detail about individual components within system 100, is given with respect to FIGS. 4, 5, 10, and 11.

Customer computer systems 110 may, for example, be personal computers, laptop computers, workstations, tablets, smart phones, servers, or any other appropriate computational devices for communicating with service provider network 130 through communication network 120. Communication network 120 may, for example, be a combination of one or more local area networks, wide area networks, and wireless networks. In particular implementations, communication network 120 may include the Internet.

Among other things, service provider network 130 includes a number of server computers 140. As illustrated, each server computer 140 is capable of supporting a number of virtual machines 142. A virtual machine may, for example, be a partition of processing resources, memory resources, storage resources, and networking resources on a server computer 140. After partitioning, a virtual machine may execute to perform functions for the customer, such as a function of a web server for the customer's web site, or to perform compute functions, such as encoding video. Virtual machines 142 may vary in type and size from each other.

Each virtual machine 142 may include one or more virtual disks 143. Virtual disks 143 emulate the functions of a traditional disk (e.g., a hard drive), so that the operating system for the virtual machine may write and read data as if the virtual machine were a standard computer (e.g., a desktop computer or server computer).

While virtual disks may appear to the operating system to be traditional disks, they may have various formats. For example, a virtual disk may be fixed in size, meaning that the virtual disk is pre-allocated on the server computer's storage device to the maximum size requested for the virtual disk. As another example, a virtual disk may be dynamically expandable, also referred to as a "sparse" disk, which means that the virtual disk uses only as much space on the server computer's storage device as needed to store the actual data the virtual disk currently contains. When creating this type of virtual disk, the amount of free space on the physical disk need not be tested based on the maximum size requested for the disk; therefore, it is possible to successfully create a dynamic virtual disk with a maximum size larger than the available physical disk free space. As an additional example, a virtual disk may use a "differencing" technique, meaning that a parent virtual disk is used as the baseline, with any subsequent writes to the virtual disk being implemented as differences to a new differencing virtual disk, and the parent virtual disk image file is not modified. For instance, if a clean-install system boot operating system virtual disk is the parent and a differencing virtual disk is designated as the current virtual disk for the system to use, then the operating system on the parent virtual disk stays in its original state, which may allow for quick recovery or for quickly creating more boot images based on additional differencing virtual disks.

Figure 3:
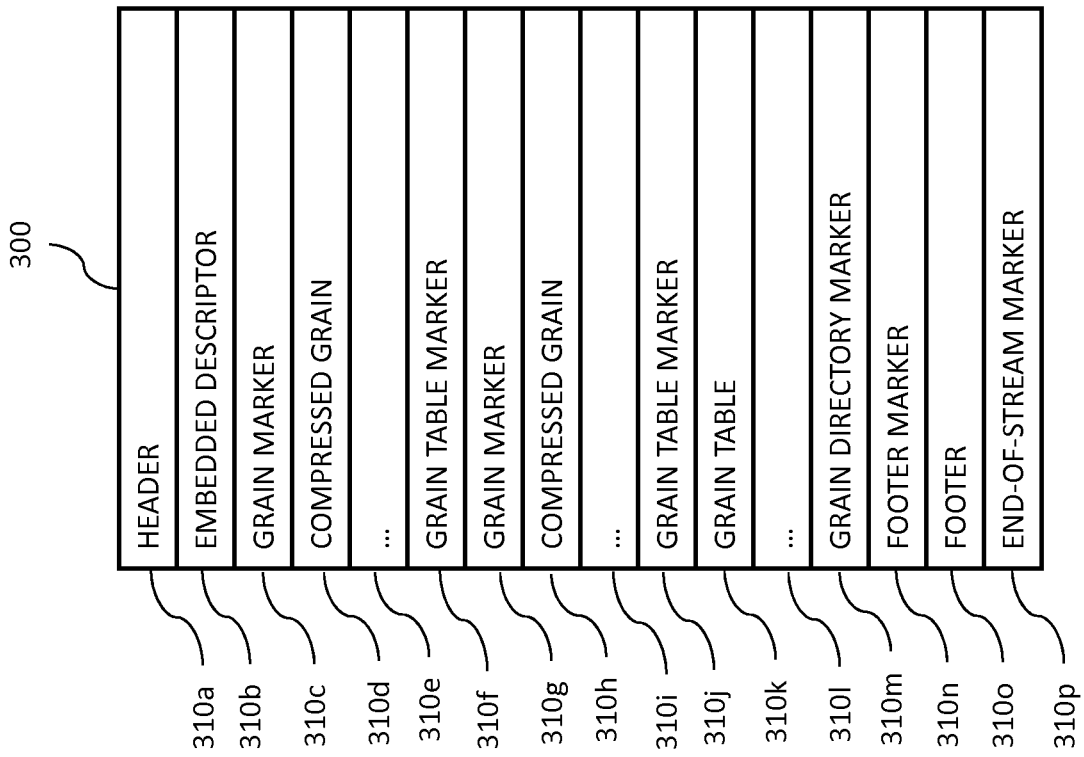
FIG. 3 is a block diagram illustrating selected components of another example virtual disk architecture.
Figure 2:
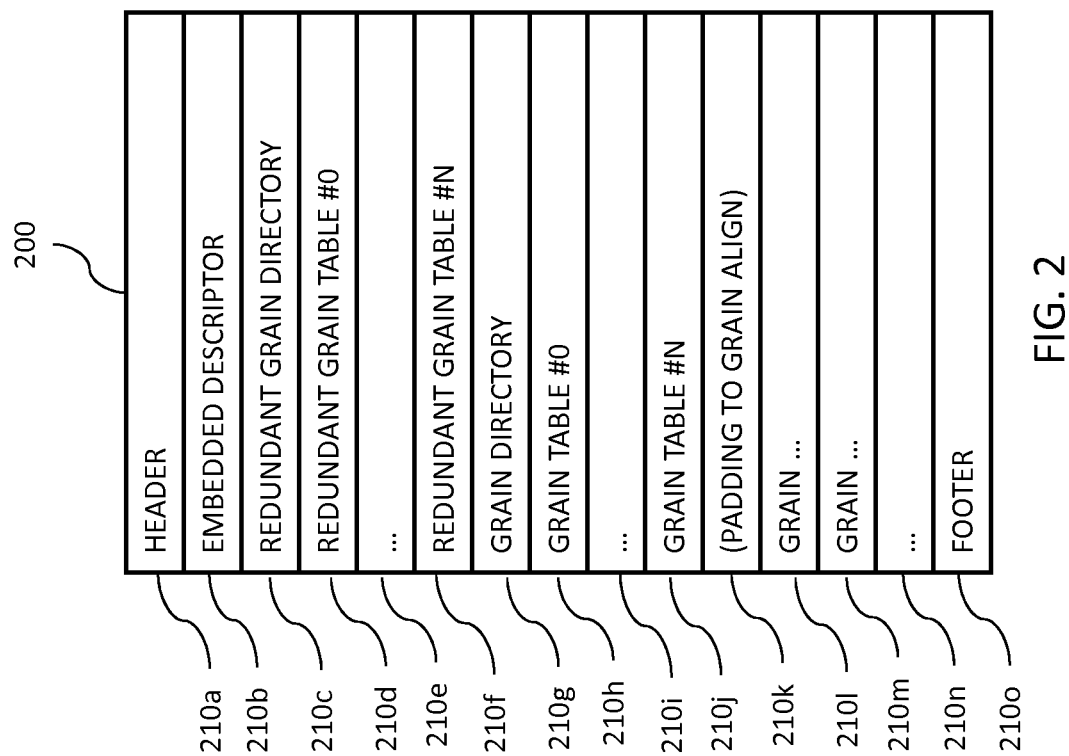
FIG. 2 is a block diagram illustrating selected components of an example virtual disk architecture.

Virtual disks are stored as files that include information that describes how the virtual disk is managed (usually in the form of a header) and the actual data. Example formats of virtual disks are illustrated in FIGS. 2-3. Virtual disks are from a variety sources, including the virtual machine disk (VMDK) from VMware of Palo Alto, Calif. (USA) and the virtual hard disk (VHD) from Microsoft Corporation of Redmond, Wash. (USA).

To request computer resources, a customer computer system 110 may submit a resource request through communication network 120. The resource request may, for instance, request that the service provider network 130 instantiate a new instance of a virtual machine, which would be provisioned on one of server computers 140. The resource request could, for example, include an instance type identifier that generally specifies the type of virtual machine instance that is requested. For example, the instance type identifier might generally specify a desired level of processing capability, a desired amount of processing memory, and a desired amount of storage for the new virtual machine instance.

The service provider operating the service provider network 130 may charge a fee for operating the computer resources to the customer that requests and uses the resources. The fee charged for a particular resource might be based upon the type and/or configuration of the resource. The fee charged for a particular resource might also be based upon the amount of time the resource is utilized. For example, in the case of a data processing resource, like virtual machine instance 142a, the fee for use of the resource might be charged based upon the configuration of the virtual machine instance and the amount of time the virtual machine instance is utilized. In the case of a data storage resource, the fee might be changed based upon the amount of data stored and/or the amount of data transferred into or out of storage. The fees for other types of resources might be based upon other considerations. A service provider might also utilize various purchasing models to determine the amount to charge a customer for use of resources provided by the service provider.

Customer computer systems 110 may provide resource requests to service provider network 130 through an interface 131. Interface 131 may, for example, be a web services application programming interface (API) to allow customers to submit resource requests. In one implementation, the functionality for submitting a resource request is provided by an API call through which a customer can specify a resource request. For instance, an example API call might allow customers of the service provider network 130 to specify information regarding a virtual machine instance 142 (e.g., processing capability, processing memory, and network bandwidth). In certain embodiments, interface 131 may be implemented as a gateway router.

Server computers 140 include a host manager 144, which is responsible for managing virtual machines 142. For example, host manager 144 may be configured to configure and launch the virtual machines. Host manager 144 may, for instance, be a hypervisor or another type of program configured to enable the execution of multiple virtual machines on a single server computer.

Within the service provider network 130, interface 132 connects to another computer network—network infrastructure 139. Network infrastructure 139 may, for example, be an intranet that is separate from communication network 120.

Also connected to network infrastructure 139 are an import manager 132 and a storage volume 136. In certain situations, a customer may desire to import all or part of a virtual machine into service provider network 130 for implementation as one of virtual machines 142. As part of this, one or more virtual disks may need to be imported into service provider network 130. Import manager 132 may be responsible for importing a virtual disk and readying it for implementation as one of virtual disks 143. Import manager 132 may, for example, be implemented as a service, which could include one or more computer systems. An example service is discussed below with respect to FIG. 5.

Among other things, import manager 132 is responsible for managing customer requests regarding importing virtual disks. As part of its operation, import manager 132 may download portions of a virtual disk to determine various characteristics of the disk (e.g., type, format, size, integrity, etc.). The import manager may then determine if there are any problems with the disk (e.g., integrity failure). The import manager may also determine whether the virtual disk to be imported is supported by the service provider network 130. If there any problems with the virtual disk to be imported or the disk to be imported is not acceptable to the service provider network 130, the import manager 132 may inform the customer (e.g., by electronic message or portal update) that the virtual disk may not be imported. If, however, there are no problems with the virtual disk and the virtual disk is supported by the service provider network 130, the import manager may begin the process of downloading the entire virtual disk, which will be explained in more detail below.

As the virtual disk is downloaded, it may be stored on storage volume 136, which may, for example, provide block storage. Once the disk has been downloaded, it may be checked to determine whether it is a bootable disk (e.g., it contains an operating system). For instance, the master boot record for the disk may be analyzed to see whether appropriate flags have been set in the header. In certain implementations, a virtual disk may contain multiple operating systems, and the master boot record may be analyzed to determine the default operating system. If the disk is bootable, import manager 132 may boot the disk and check that it is operating properly. Once it is determined that the disk is operating properly, the disk may be made available for use on one of virtual machines 142. If a disk is not bootable (e.g., it is a data disk), the disk may be attached to a bootable disk and made available to the intended virtual machine.

System 100 also includes a server computer 150, which is accessible through communication network 120. In general server computers like server computer 150 are publically accessible (e.g., over the Internet) and may provide any type of IT service. For example, the services may web hosting or computational services (e.g., mapping services).

Server computer 150 includes an example virtual machine 152 having a virtual disk 154 that may be imported into service provider network 130. Although server computer 150 is only shown with one virtual machine 152, it should be understood that server computer 150 may include any number of virtual machines. Moreover, server computer 150 may be part of a collection of server computers (e.g., a data center).

Server computer 150 also includes a host manager 156, which is responsible for managing virtual machine 152. For example, host manager 156 may be configured to configure and launch the virtual machine. Host manager 156 may, for instance, be a hypervisor or another type of program configured to enable the execution of multiple virtual machines on a single server computer.

As mentioned above, in certain modes of operation, a customer may specify a virtual disk to be imported into service provider network 130, such as virtual disk 154. Import manager 132 may receive this request and then download a portion of the virtual disk to analyze whether the disk may be imported successfully.

To download a portion of the virtual disk, import manager 132 may, for example, use an hypertext transport protocol (HTTP) range GET. An HTTP range GET allows a request to specify the portions of a file to retrieve. For example, HTTP retrieval requests may use conditional or unconditional GET methods to request one or more sub-ranges of an entity, instead of the entire entity, using the Range request header, which applies to the entity returned as the result of the request. The user may, for example, specify an address (e.g., a uniform resource locator (URL)) at which to locate the virtual disk and allow access to the virtual disk. For example, the user may store the virtual disk in a storage service as a file or object, such as Amazon's S3 storage service, and obtain a URL to the file that can be passed to the import manager 132.

FIG. 2 illustrates the architecture of an example virtual disk 200. As illustrated, virtual disk 200 has a number of portions 210, including a header portion 210a, a descriptor portion 201b, a grain directory portion 210g, grain table portions 210h-210i, grain portions 210l-210n, and a footer portion 210o.

Header portion 210a includes basic information about the virtual disk (e.g., format, capacity, grain size, etc.). An example header portion is shown below for a sparse virtual machine disk (VMDK) from VMware of Palo Alto, Calif. (USA):

```
typedef uint64 SectorType;
typedef uint8 Bool;
typedef struct SparseExtentHeader {
    uint32 magicNumber;
    uint32 version;
    uint32 flags;
    SectorType capacity;
    SectorType grainSize;
    SectorType descriptorOffset;
    SectorType descriptorSize;
    uint32 numGTEsPerGT;
    SectorType rgdOffset;
    SectorType gdOffset;
    SectorType overHead;
    Bool uncleanShutdown;
    char singleEndLineChar;
    char nonEndLineChar;
    char doubleEndLineChar1;
    char doubleEndLineChar2;
    uint16 compressAlgorithm;
    uint8 pad[433];
} SparseExtentHeader;
```

Table 1 defines some of the variable in the header. Footer portion 210o may be similar or identical to header portion 210a.

TABLE 1

VMDK Header Definitions

| Variable | Definition |
| --- | --- |
| magicNumber | Used to verify the validity of the sparse disk when the disk is opened. The header is stored on disk in little-endian byte order, so examining the first eight bytes of a VMDK file, will reveal 'K' 'D' 'M' 'V' 0x01 0x00 0x00 0x00 or 'K' 'D' 'M' 'V' 0x02 0x00 0x00 0x00. In this example, the magicNumber is initialized with #define SPARSE_MAGICNUMBER 0x564d444b /* 'V' 'M' 'D' 'K' */. |
| Flags | Contains the following bits of information in the sparse format:<br>bit 0: valid new line detection test.<br>bit 1: redundant grain table will be used.<br>bit 2: zeroed-grain GTE will be used.<br>bit 16: the grains are compressed.<br>bit 17: there are markers in the virtual disk to identify |

TABLE 1-continued

VMDK Header Definitions

| Variable | Definition |
| --- | --- |
| | every block of metadata or data and the markers for the virtual machine data contain logical block addressing (LBA). |
| grainSize | Size of a grain in sectors. It must be a power of 2 and must be greater than 8 (4 KB). |
| capacity | The capacity of this disk in sectors (should be a multiple of the grain size). |
| descriptorOffset | The offset of the embedded descriptor in the disk. It is expressed in sectors. If the descriptor is not embedded, all the extents in the link have the descriptor offset field set to 0. |
| descriptorSize | Valid only if descriptorOffset is non-zero. It is expressed in sectors. |
| numGTEsPerGT | The number of entries in a grain table. The value of this entry for virtual disks is 512. |
| rgdOffset | Points to the redundant level 0 of metadata. It is expressed in sectors. |
| gdOffset | Points to the level 0 of metadata. It is expressed in sectors. |
| overhead | The number of sectors occupied by the metadata. |
| uncleanShutdown | Set to FALSE when disk is closed. After disk has been opened, software checks for the value of uncleanShutdown. If TRUE, the disk is checked for consistency and uncleanShutdown is set to TRUE after this consistency check. Thus, if the software crashes before the disk is closed, this boolean is found to be set to TRUE the next time the virtual machine is powered on. |
| compressAlgorithm | Designates the algorithm to compress every grain in the virtual disk. If bit 16 of the flags field is not set, COMPRESSION_NONE is assumed. The deflate algorithm is described in RFC 1951. |

Grain directory portion 210g contains a number of number of entries that point to the grain table portions 210h-210i. In particular implementations, a grain directory entry is an offset in sectors of a grain table portion in the sparse disk. The number of grain directory entries per grain directory portion (i.e., the size of the grain directory) depends on the size of the virtual disk. Sparse VMDKs includes a redundant grain directory portion 210c to improve the virtual disk's resilience to host drive corruption.

Grain table portions 210h-210j includes a number of entries that each point to the offset of a grain in a sparse disk. There may, for example, be 512 entries in a grain table, and a grain table entry may be a 32-bit quantity. Consequently, each grain table is 2 KB. In a newly created sparse disk, the grain table entries may be initialized to 0, meaning that the grain to which each grain table entry points is not yet allocated. Once a grain is created, the corresponding grain table entry is initialized with the offset of the grain in the sparse disks in sectors. Sparse VMDK include redundant grain table portions 210d-210f to improve the virtual disk's resilience to host drive corruption.

Each grain portion 210l-210n is a block of sectors containing virtual disk data. The granularity is the size of the disk in sectors. The default size may be 128 sectors or 64 KB. Each grain starts at an offset that is a multiple of the grain size. In an example embodiment, the import manager 132 can be configured with information about the virtual disk types and use ranged GET methods to read different portions of the file in order to determine the type of file.

FIG. 3 illustrates the architecture of another example virtual disk 300. As illustrated, virtual disk 300 has a number of portions 310. Virtual disk 300 may, for example, be similar to a stream-optimized sparse VMDK disk.

Header portion 310a includes basic information about the virtual disk (e.g., format, capacity, grain size, etc.). Header portion 310a may be similar to the header portion 210a.

There are five types of markers: compressed grain markers, grain table markers, grain directory markers, footer markets, and end-of-stream markers. Each marker and its associated block begin on a sector or 512-byte boundary. Each marker can be seen as a C structure with the following layout:

```
struct Marker {
SectorType val;
uint32 size;
union {
uint32 type;
uint8 data[0];
} u;
};
```

Various types of markers and their associated blocks may be distinguished based on the values of val, size, and type. In the following discussion of marker types, m is a pointer to a marker defined by the Marker structure.

Grain markers are indicated by a non-zero size so there is no type ID for them:
define MARKER_EOS 0
define MARKER_GT 1
define MARKER_GD 2
define MARKER_FOOTER 3

For compressed grain markers, pointer m is a marker for a compressed grain if m→size !=0. In this case, the marker and block have the following layout:

```
struct GrainMarker {
SectorType lba;
uint32 size;
uint8 data[0];
};
```

In this structure:
lba is the offset in the virtual disk where the block of compressed data is located
size is the size of the compressed data in bytes
data is the data compressed with RFC 1951

For the end-of-stream marker, pointer m is an end-of-stream marker if m→size==0 && m→u.type=MARKER_EOS. The end-of-stream marker signals the end of the virtual disk. Each end-of-stream marker is padded to occupy a sector. The structure may, for example, look like this:

```
struct EOSMarker {
SectorType val;
uint32 size;
uint32 type;
uint8 pad[496];
};
```

In this structure:
val is 0.
size is 0.
type is MARKER_EOS (0).
pad is unused. It must be written as zero and ignored on read.

Metadata markers are using to signal the blocks containing grain tables, grain directories, or footers and have the same layout:
If m→size=0 && m→u.type=MARKER_GT, m is a marker for a grain table.
If m→size=0 && m→u.type=MARKER_GD, m is a marker for a grain directory.
If m→size=0 && m→u.type=MARKER_FOOTER, m is a marker for a footer.

These markers and the blocks of data they signal have the following layout:

```
struct MetaDataMarker {
SectorType numSectors;
uint32 size;
uint32 type;
uint8 pad[496];
uint8 metadata[0];
};
```

In this structure:
numSectors is the number of sectors occupied by the metadata, excluding the marker itself.
size is 0.
type is one of MARKER_GT (1), MARKER_GD (2), or MARKER_FOOTER (3).
pad is unused. It must be written as zero and ignored on read.
metadata points to a grain table if type is MARKER_GT, a grain directory if type is MARKER_GD, or a footer if type is MARKER_FOOTER.

Footer portion 310o may be the same as header portion 310a. The footer may take precedence over the header when the footer exists. The footer is typically the last block of the virtual disk and is followed by the end-of-stream marker so that they together occupy the last two sectors of the disk.

Stream-optimized compressed sparse disks differ from regular sparse disks in that:
flags has bits 16 and 17 set to indicate that the grains are compressed and that each block of metadata or data is identified by a marker;
compressAlgorithm is set to COMPRESSION_DEFLATE (1). (This compression algorithm is described in RFC 1951.); and
The rgdOffset should be ignored because bit 1 of the flags field is not set.

The header and footer differ in that the field gdOffset is set to #define GD_AT_END 0xffffffffffffffff in the copy of the header stored at the very beginning of the disk, whereas it is set to the proper value for the copy of the header (footer) that is stored at the end of the disk.

In the discussed examples, header 210a for a sparse VMDK disk is 512 bytes in length and is located at the zeroth byte (i.e., no offset). Similar parameters are known for the descriptor portion 210, the grain directory portion 210g, and the footer portion 210o. Thus, by using an HTTP range get, import manager 132 may request just a portion (e.g., the header) of the virtual disk. By analyzing the header, for example, import manager 132 may determine what type of disk the virtual disk to be imported is (e.g., VMDK, VHD, or RAW), what the format of the disk is (e.g., fixed versus sparse), the size of the disk, and where the footer is located.

As an example of determining the type of disk, import manager 132 may parse the header to locate the magic number. If the magic number contains KDMV, import manager 132 may determine that the virtual disk is a VMDK disk. As another example, if the import manager 132 determines that the magic number contains CONNECTIX, the import manager may determine that the virtual disk is a VHD disk. The magic number may also be used to determine the format type of the disk (e.g., fixed versus sparse) and check the validity of the virtual disk. For instance, the disk type may be compared to an expected disk type to determine if the disk is what is expected. To determine the type of virtual disk and the format, the import manager 132 may compare data about the virtual disk to signatures for virtual disks. Virtual disk signatures may be stored in a data store 133 for import manager to compare against. In certain implementations, import manager 132 may need to download different portions of a virtual disk in trying to determine what type of virtual disk a virtual disk is. For example, one type of virtual disk may have a header that is 256 bytes long with no offset, and another type of virtual disk may have a header that is 512 bytes long with an offset. Import manager 132 may, for example, download a virtual disk portion believed to be a header for a first virtual disk type and parse the header to find the magic number (e.g., by looking at a specific location or parsing an XML file). If an appropriate magic number is not found, import manager 132 may download another portion believed to be a header for a second virtual disk type and parse this header in attempt to find the magic number. If the import manager finds a file type that it recognizes, it may proceed with further processing, as discussed below. If the import manager does not recognize the virtual disk type after trying several types, the import manager may generate a message for the customer that describes the error (e.g., virtual disk type not recognized).

If, however, the import manager 132 recognizes a virtual disk type, the import manager may then parse the header again to find the disk format type (e.g., fixed versus sparse) and the capacity of the disk (when expanded). Once the import manager determines the disk format type and the capacity of the disk, the import manager may download another portion of the virtual disk (e.g., the footer). The footer may, for example, be found by knowing the size of a fixed disk and reading the last portion of the disk (e.g., the last 512 bytes) since the footer comes at the end of the disk. For a sparse disk, the grain tables may be analyzed to find where the footer resides. If required, import manager may also download the grain directory, which can be used to iterate through blocks of data within a disk.

The import manager can be configured to use ranged GET methods to locate the footer, e.g., by checking offsets where the footer is expected to be in the file. Using the footer, the import manager 132 may verify the integrity of the virtual disk (e.g., by comparing the footer to the header). If the header does not correspond to the footer, the virtual disk may fail the integrity check. Additionally, the size of the virtual disk may be checked to make sure that it corresponds to what is expected from the header. If the virtual disk fails the integrity check, the import manager may notify the customer of the error and halt the import process.

If the disk passes the check, the import manager 132 may determine whether the virtual disk is supported by the service provider network 130. To accomplish this, import manager 132 may, for example, use ranged GET methods to read portions of the virtual disk. For example, the import manager 132 can be configured to read a first portion of the virtual disk and compare what it reads to information in a database that maps different characteristics of virtual disks to virtual disk formats. In the situation where the first portion does not match any record, the import manager can read a second portion and so on and so forth until it makes a match or no match is found. As the import manager performs a read, it can determine whether the characteristics of the virtual disk (e.g., disk type, disk format, and capacity) match characteristics of virtual disk profiles in data store 134. Each virtual disk profile may, for example, be a record in a database, and the import manager may query the database to see if any records match the characteristics of the virtual disk. If the characteristics of the virtual disk do not match those of any virtual disk profile 134, the import manager may notify the customer that the virtual disk is not supported by the service provider network 132 and halt the import process. If, however, the characteristics of the virtual disk do match those of a virtual disk profile 134, import manager may begin downloading the entire virtual disk.

During download, the virtual disk may be stored in storage volume 136. Storage volume 136 may, for example, provide block storage. Once the virtual disk has been downloaded to storage volume 136, it may be modified to run inside the service provider network and tested.

In certain implementations, to modify the virtual disk for the service provider network and test it, a disk volume may be created from the block-stored virtual disk. In certain implementations, this may include converting the disk to a type supported by the service provider network (e.g., from VMDK to RAW). The volume may be attached to a code injector, which will then operate on the volumes to perform injection. The code injector may understand the volumes and partitions and determine how the volumes will be attached in the booter instance. As part of completing code injection, the injector instance will return the storage volume mapping back to the import manager 132. The import manager will use this information to setup a booter instance.

When performing the actual injection, the injector may need to support the presence of more than one volume. It can handle scenarios where the OS is installed in a split manner across the volumes.

Import manager 132 may then launch a boot instance with the volumes attached with appropriate storage device mapping. The boot instance will perform an installation phase where it will install a set of drivers and/or binaries. After the installation, the boot instance will reboot itself for the installed drivers and/or binaries to take effect. The import manager will wait for the boot instance to come up with networking connectivity. Once that happens the import manager will detach the volumes and shut down the boot instance, and the boot instance may be terminated. If the boot is successful, a snapshot of the virtual disk is created In certain implementations, a virtual machine image, from which a virtual machine may be launched, may be created using the copied snapshot from the customer's account. A virtual machine image may, for example, include a template for the root volume for the instance (for example, an operating system, an application server, and applications), launch permissions that control which customer accounts can use the virtual machine image to launch instances, and a block device mapping that specifies the volumes to attach to the instance when it is launched.

In certain implementations, virtual disk 154 may be a collection of virtual disks. For example, a number of virtual disks may be stored in an Open Virtualization Format (OVF) package. An OVF package is a tar that builds an envelope over all the individual files that make up a virtual machine (descriptor, manifest, disk images, etc.). The OVF descriptor contains the metadata about the OVF package. This is an extensible XML document for encoding information, such as product details, virtual hardware requirements, and licensing.

To migrate the virtual disks in an OVF package, import manager 132 should determine whether it is an OVF package and if it is valid and complete. To determine whether a virtual disk is an OVF package, the import manager 132 may determine whether an OVF descriptor file, which is parsable XML file, is present using, for example, ranged GET methods to read a location where the OVF descriptor file is expected (or read data that indicates where the OVF is located). The descriptor file should contain many entries that should indicate whether the file is an OVF file (e.g., "ovf: id").

To determine whether a package is complete, the file reference part of the OVF package may be analyzed. The file reference part provides a listing of all the files in the OVF package, and the integrity of an OVF package may be determined without having to parse or interpret the entire structure of the descriptor. The integrity of the OVF file may, for example, be determined by locating the listed disks in the file, which is discussed in more detail below. For example, if all of the disks are present, the integrity check will pass. If not all the virtual disks are present, the OVF file integrity check may fail. Tools can safely manipulate (for example, copy or archive) OVF packages with no risk of losing files.

Each File element in the reference part is given an identifier using the ovf:id attribute. The identifier is unique inside an OVF package. Each File element is specified using the ovf:href attribute, which shall contain a URL. Relative-path references and the URL schemes "file", "http", and "https" are supported. If no URL scheme is specified, the value of the ovf:href attribute may be interpreted as a path name of the referenced file relative to the location of the OVF descriptor itself. The size of the referenced file may be specified using the ovf:size attribute. The unit of this attribute is in bytes. If present, the value of the ovf:size attribute should match the actual size of the referenced file. An example structure of an OVF descriptor with a top-level envelope element is:

```
<?xml version="1.0" encoding="UTF-8" ?>
<Envelope xmlns:xsi="http://www.w3.org/2001/XMLSchema-instance"
xmlns:vssd="http://schemas.dmtf.org/wbem/wscim/1/cim-schema/2/CIM_Virtual System SettingData"
xmlns:rasd="http://schemas.dmtf.org/wbem/wscim/1/cim-schema/2/CIM_ResourceAllocationSettingData"
xmlns:ovf="http://schemas.dmtf.org/ovf/envelope/2"
xmlns="http://schemas.dmtf.org/ovf/envelope/2"
xml:lang="en-US">
<References>
<File ovf:id="de-DE-resources.xml" ovf:size="15240" ovf:href="http://mywebsite/virtualappliances/de-DE-resources.xml"/>
<File ovf:id="file1" ovf:href="vmdisk1.vmdk" ovf:size="180114671"/>
<File ovf:id="file2" ovf:href="vmdisk2.vmdk" ovf:size="4882023564" ovf:chunkSize="2147483648"/>
<File ovf:id="file3" ovf:href="resource.iso" ovf:size="212148764" ovf:compression="gzip"/>
<File ovf:id="icon" ovf:href="icon.png" ovf:size="1360"/>
</References>
<!-- Describes meta-information about all virtual disks in the package -->
<DiskSection>
<Info>Describes the set of virtual disks</Info>
<!-- Additional section content -->
</DiskSection> 1523
<!-- Describes all networks used in the package -->
<NetworkSection>
<Info>List of logical networks used in the package</Info>
<!-- Additional section content -->
</NetworkSection>
<SomeSection ovf:required="false">
<Info>A plain-text description of the content</Info>
<!-- Additional section content -->
</SomeSection>
<!-- Additional sections can follow -->
<VirtualSystemCollection ovf:id="Some Product">
<!-- Additional sections including VirtualSystem or VirtualSystemCollection -->
</VirtualSystemCollection>
<Strings xml:lang="de-DE">
<!-- Specification of message resource bundles for de-DE locale -->
</Strings>
</Envelope>
```

The DiskSection element describes meta-information about the virtual disks in the OVF package. The DiskSection element is valid as a direct child element of the Envelope element. Each virtual disk represented by a Disk element is given an identifier using the ovf:diskId attribute. The identifier is unique within the DiskSection element. The capacity of a virtual disk is specified by the ovf:capacity attribute with an xs:long integer value. The default unit of allocation is bytes. The optional string attribute ovf:capacityAllocationUnits may be used to specify a particular unit of allocation. Values for ovf:capacityAllocationUnits use a base unit of bytes. An example disk section is shown below:

```
<DiskSection>
<Info>Describes the set of virtual disks</Info>
<Disk ovf:diskId="vmdisk1" ovf:fileRef="file1" ovf:capacity="8589934592"
ovf:populatedSize="3549324972"
ovf:format=
"http://www.vmware.com/interfaces/specifications/vmdk.html#sparse">
</Disk>
<Disk ovf:diskId="vmdisk2" ovf:capacity="536870912"
</Disk>
<Disk ovf:diskId="vmdisk3" ovf:capacity="${disk.size}"
ovf:capacityAllocationUnits="byte*2^30"
</Disk>
</DiskSection>
```

The ovf:fileRef attribute denotes the virtual disk content by identifying an existing File element in the References element. The File element is identified by matching its ovf:id attribute value with the ovf:fileRef attribute value. Omitting the ovf:fileRef attribute indicates an empty disk. If an empty disk is indicated, the virtual disk is created and the content zeroed at deployment.

The format URI of a non-empty virtual disk is specified by the ovf:format attribute. OVF does not require any specific disk format to be used, but to comply with the specification, the disk format should be given by a URI that identifies an unencumbered specification on how to interpret the disk format. The specification need not be machine readable, but it shall be static and unique so that the URI may be used as a key by software reading an OVF package to uniquely determine the format of the disk. The URI should be resolvable.

Different Disk elements should not contain ovf:fileRef attributes with identical values. Disk elements should be ordered such that they identify any File elements in the same order as these are defined in the References element.

For empty disks, rather than specifying a fixed virtual disk capacity, the capacity may be given using a reference to a Property element in a ProductSection element. This is done by setting ovf:capacity="${<id>}" where <id> shall be the identifier of a Property element in the ProductSection element. The Property element value should resolve to an xs:long integer value. The ovf:capacityAllocationUnits attribute is useful when using Property elements because a user may be prompted and can then enter disk sizing information in appropriate units, for example gigabytes. For non-empty disks, the actual used size of the disk may be specified using the ovf:populatedSize attribute. The unit of this attribute shall be bytes. The ovf:populatedSize attribute may be an estimate of used disk size but shall not be larger than ovf:capacity.

By parsing the disk section of the envelope, the number of disks may be determined, along with their capacity and current size. By referencing to the file section from the disk section using the file Ref, the location of the associated disks may be determined (e.g., by URL or ovf:href). Import manager 132 may then iterate through the remaining archived files in the OVF package to locate these disks. A failure will occur if all of the disks are not found as they may be needed all of them for the virtual machine to boot properly. An appropriate error message may be sent to the customer if all the virtual disks are not found.

If the disks are located, import manger 132 begins the previously discussed process of determining what type of disk each is (VMDK, VHD, RAW, etc.) and checks the integrity of the disks. If the disks are valid, the location of the disks within the OVF package (e.g., byte offset) is stored, along with the size of the disks. This information may be used because further processing (e.g., converting the format and injecting drivers, etc.) can be done in parallel by different processes/hosts by knowing this location info. The import manager may then begin downloading the virtual disks (either serially or in parallel).

System 100 has a variety of features. By being able to assess a virtual disk before it is downloaded, substantial time and resources may be conserved. For example, some virtual disks are up to 2 Terabytes in size. Thus, downloading these disks is a very time consuming, not to mention costly, process. But system 100 is able to identify characteristics of the disks, analyze the integrity of the disks, and determining whether the service provider network is able to host the virtual disk before downloading the disk as a whole, which can lead to refusing to download large portions of a disk when the import will be a failure. Moreover, since the portions downloaded for the checks are small (e.g., 512 bytes), the analysis may be performed in a quick and cost-efficient manner.

Additionally, system 100 does not require a customer to remember the type of format of their virtual disks. This is sometimes cumbersome for customers. Moreover, if they specify the wrong format, the import process will fail. System 100, however, automatically determines the type and format of a virtual disk for the customer.

System 100 also allows a group of virtual disks (e.g., in an OVF package) to be checked before download. Because a failure of any virtual disk will probably mean that an entire group of virtual disks will not work, checking each disk before downloading all of them is a substantial benefit. Moreover, checking validity of the entire OVF package, checking the validity of each archived file, determining the size of the archived files, and determining whether the virtual disks are supported by the service provider network can be obtained by reading just the small portions of each file (e.g. 512 bytes). If the remote host allows seeking, import manager 132 can jump across files without having to iterate through the entire data or the downloading entire data. This allows the import manager to obtain very minimal information to validate an OVF package file and get location information of each disk to process.

Although FIG. 1 illustrates one example system for importing virtual drives, other systems for importing virtual drives may include fewer, additional, and/or a different arrangement of components. For example, in some systems, server computer 150 may be part of a service provider network. As another example, virtual disk 154 may be stored on any type of computer that is accessible over communication network 120. As an additional example, virtual disk signatures and virtual disk profiles may be stored together. As a further example, virtual disk importation may be performed for computing platforms other than service provider networks.

Figure 4:
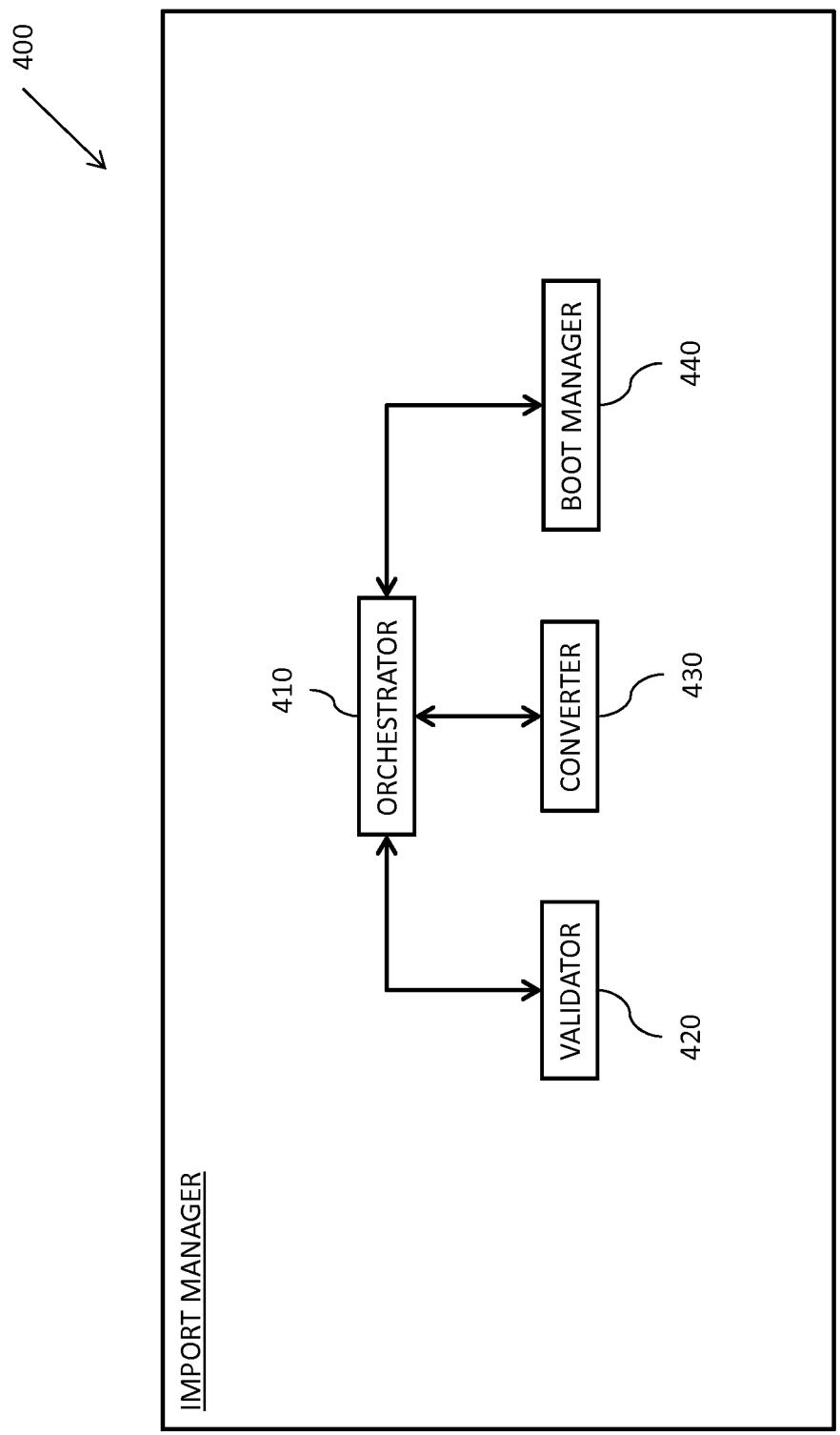
FIG. 4 is a block diagram illustrating selected components of an example virtual disk import manager.

FIG. 4 illustrates an example implementation of an import manager 400, which may be similar to import manager 132 in system 100. Import manager 400 includes an orchestrator 410, a validator 420, a convertor 430, and a boot manager 440. Each component of import manager 400 can be implemented as a program that runs on one or more computer systems. In an example embodiment, each program can store its state in one or more data stores (e.g., databases or in shared storage). In general, orchestrator 410 is responsible for receiving requests for virtual disk importation (e.g., from a customer) and coordinating between the various stages. Validator 420 is responsible for determining whether one or more virtual disks may be imported. Convertor 430 is responsible for downloading each virtual disk and converting to an appropriate format, and boot manager 440 is responsible for booting an imported disk to make sure it operates properly In certain modes of operation, a web service front end to import manager 400, such as a web service API can receive web service requests specifying, for example, a customer, an address (e.g., a URL) for the virtual disk to be imported, customer credentials, and any information necessary to access the virtual disk. The message can be parsed and the contents (e.g., address) can be stored in a data store. The orchestrator 410 can include a worker process that checks the data store for new requests messages; assigns the request a job identifier; and then processes them.

Once a new import request has been received, orchestrator 410 may spawn validator 420 and inform it of the address of the virtual disk to be imported. For example, validator 420 can read that data store, obtain the address and any information necessary to access the virtual disk and insert information indicating that it is processing the request. Validator 420 may then execute a process to retrieve part of the virtual disk, e.g., it can send an HTTP range GET to download a portion of the virtual disk (e.g., to download the first 512 bytes).

In particular implementations, the validator 420 can be configured to locate the header of the virtual disk using a range GET. Validator 420 may then analyze the header to obtain desired information. For example, a worker process may try to locate various information regarding the virtual disk (e.g., magic number, capacity, and grain table) by doing ranged GETs to byte ranges where the information should be located in the file and then comparing the data to information about the various virtual disks the import manager supports. In some implementations, the validator 420 may retrieve an entire portion suspected to be a header and analyze the retrieved portion for expected information.

Using the magic number, the validator 420 may try to determine what type of virtual disk is present (e.g., VMDK, VHD, or RAW). For instance, the validator may determine whether a portion of the magic number matches a portion of a signature for a virtual disk. By similarly analyzing the header, the validator may determine what the format of the disk is (e.g., fixed versus sparse), the size of the disk, and where the footer is located.

If any of the data cannot be determined for the virtual disk, the validator may select another way to analyze the virtual disk. For example, virtual disk signatures may be stored in a data store that is accessible to the validator. The validator may check this data store to determine which portions of a virtual disk to download for analysis (e.g., first 256 bytes, first 512 bytes, last 256 bytes, etc.). In certain implementations, validator 420 may need to download different portions of a virtual disk in trying to determine what type of virtual disk a virtual disk is. For example, one type of virtual disk may have a header that is 256 bytes long with no offset, and another type of virtual disk may have a header that is 512 bytes long with an offset.

Validator 420 may, for example, download a file portion believed to be a header for a first virtual disk type and parse the header to find the magic number (e.g., by looking at a specific location or parsing an XML file). If an appropriate magic number is not found, validator may download another portion believed to be a header for a second virtual disk type and parse this header in attempt to find the magic number. If the validator finds a disk type that it recognizes (e.g., by comparing what it receives to information it has that describes the various virtual disk formats), it may proceed with further processing, as discussed below. If the validator does not recognize any virtual disk type, it may report back to the orchestrator 410 regarding the failure and halt the import process (e.g., by updating a row in the data store associated with the job identifier for the import request). The orchestrator may then generate a message for the customer that describes the error (e.g., disk type not recognized).

If the validator 132 recognizes a disk type, the validator may then parse the header again to find the disk format (e.g., fixed versus sparse) and the capacity of the disk (when expanded). Once the validator has determined the disk type and the capacity of the disk, the validator may download another portion of the virtual disk (e.g., the footer). The footer may, for example, be found by knowing the size of a fixed disk and reading the last portion of the disk (e.g., the last 512 bytes) since the footer comes at the end of the disk. For a sparse disk, grain tables may be analyzed to determine where the footer resides.

Using the footer, the validator may determine whether the virtual disk has integrity (e.g., by comparing the footer to the header). If the virtual disk does not have integrity (e.g., it is corrupt), the validator may notify the orchestrator 410 regarding the failure and halt the import process. The orchestrator 410 may then generate a message for the customer that describes the error.

If the virtual disk has integrity, the validator may determine whether the virtual disk is supported by the service provider network. To accomplish this, the validator may determine whether the characteristics of the virtual disk (e.g., disk type, disk format, and capacity) match characteristics stored in one or more virtual disk profiles. Each virtual disk profile may, for example, be a record in a database, and the import manager may query the database to see if any records match the characteristics of the virtual disk.

If the characteristics of the virtual disk do not match those of any virtual disk profile, the validator may notify the orchestrator regarding the error and halt the import process. The orchestrator may inform the customer that an error has occurred (e.g., virtual disk not supported).

If, however, the characteristics of the virtual disk do match those of a disk profile, the validator may inform the orchestrator (e.g., by updating a row in the data store indicating that the parsing was successful as well as populating other rows with the information it has detects about the virtual disk), and orchestrator 410 may begin the download process for the virtual disk. To download the virtual disk, orchestrator 410 may spawn convertor 430. Orchestrator 410 may pass along relevant information for the virtual disk (e.g., source, offset, length, format, etc.). After the data structure for the job is updated by the validator, the validator may read the data store for another job or exit. Orchestrator 410 can read the data store and detect that the validator has competed its work, and send a message to convertor 430 to start its part of the overall process (in the event that conversion is needed based on information written to the data store by validator and information specified by the request).

Convertor 430 may include a worker process that downloads the virtual disk beginning at an offset from the source location. The worker process may, for example, generate an HTTP range get to download the virtual disk. The virtual disk may arrive in one continuous stream or in chunks. Convertor 430 may store the virtual disk in a storage volume (e.g., block storage). Once virtual disk 154 has been downloaded to the storage volume, convertor 430 may modify the virtual disk to run inside the service provider network (e.g., by creating volumes from the block storage). Additionally, convertor 430 may convert the format type of the disk into one that is supported by the service provider network (e.g., from VMDK to RAW).

Orchestrator 410 may then call the boot manager 440 with the volumes attached with appropriate storage device mapping. The boot manager 138 may launch a boot instance to boot the disk and check that it is operating properly. For example, the boot instance may perform an installation phase where it will install a set of drivers and/or binaries. After the installation, the boot instance will reboot itself for the installed drivers and/or binaries to take effect. The boot manager may wait for the boot instance to come up with networking connectivity. Once that happens, the boot manager may detach the volumes and shut down the boot instance, and the boot instance may be terminated. If the boot is successful, orchestrator 410 may make the disk may be made available for use on a virtual machine (e.g., by creating a snapshot of the virtual disk).

In certain implementations, a virtual disk may be a collection of virtual disks. For example, a number of virtual disks may be stored in an OVF package, which is a tar that builds an envelope over all the individual files that make up a virtual machine (descriptor, manifest, disk images, etc.). The OVF descriptor contains the metadata about the OVF package. This is an extensible XML document for encoding information, such as product details, virtual hardware requirements, and licensing.

To migrate the virtual disks of OVF package, orchestrator 410 would receive a request to import a virtual disk as discussed before and spawn validator 430. Validator 430 would then determine whether an OVF package is present and if it is valid and complete. The descriptor file should contain many entries that should indicate whether the file is an OVF file (e.g., "ovf:id").

To determine whether a package is complete, validator 420 may include a worker process that download the descriptor for the OVF package. Validator 420 may then launch a worker process to parse the descriptor to obtain desired information. In particular, the file reference part may be analyzed. The file reference part provides a listing of all the files in the OVF package and determines the integrity of an OVF package without having to parse or interpret the entire structure of the descriptor. The integrity of the OVF file may, for example, be determined by locating the listed disks in the file. For example, if all of the disks are present, the OVF file may pass the integrity check. If not all the virtual disks are present, the OVF file may fail the integrity check.

Each File element in the reference part is given an identifier using the ovf:id attribute, which is unique inside an OVF package. Each File element is also specified using the ovf:href attribute, which contains a URL. Relative-path references and the URL schemes "file", "http", and "https" are supported. If no URL scheme is specified, the value of the ovf:href attribute may be interpreted as a path name of the referenced file relative to the location of the OVF descriptor itself. The size of the referenced file may be specified using the ovf:size attribute, which is expressed in bytes. If present, the value of the ovf:size attribute should match the actual size of the referenced file. An example OVF envelope was discussed previously, and also includes a DiskSelection element.

The DiskSection element describes meta-information about the virtual disks in the OVF package. Each virtual disk represented by a Disk element is given an identifier using the ovf:diskId attribute. The identifier is unique within the DiskSection element. The capacity of a virtual disk is specified by the ovf:capacity attribute with an xs:long integer value, which is typically expressed in bytes. The ovf:fileRef attribute denotes the virtual disk content by identifying an existing File element in the References element. The File element is identified by matching its ovf:id attribute value with the ovf:fileRef attribute value. Different Disk elements should not contain ovf:fileRef attributes with identical values. Disk elements are ordered such that they identify any File elements in the same order as these are defined in the References element. The format URI of a non-empty virtual disk is specified by the ovf:format attribute. For non-empty disks, the actual used size of the disk may be specified using the ovf:populatedSize attribute. The ovf:populatedSize attribute is an estimate of used disk size but shall not be larger than ovf:capacity. OVF does not require any specific disk format to be used, but to comply with the specification the disk format shall be given by a URI that identifies an unencumbered specification on how to interpret the disk format. The URI should be resolvable. An example DiskSection was discussed previously.

By parsing the DiskSection portion of the envelope, the validator 420 may determine the number of disks, along with their capacity and current size. By referencing to the FileSection from the disk section using the file Ref, the location of the associated disks may be determined (by URL or ovf:href). Validator 420 may then iterate through the remaining archived files in the OVF package to locate these disks. A failure will occur if all of the disks are not found as they may be needed for the virtual machine to boot properly.

Once the disks have been located, validator 420 begins the previously discussed process of determining what type of disk each disk is (VMDK, VHD, RAW, etc.), the format of each disk, and checks the validity and integrity of the disks. If the disks are valid, the location of the disks within the OVF package (e.g., byte offset) is stored, along with the size of the disks. This information may be used because further processing (e.g., converting the format and injecting drivers, etc.) can be done in parallel by different processes/hosts by knowing this location info.

If each of the virtual disks have integrity, the validator 420 may determine whether the virtual disks are supported by the service provider network. To accomplish this, the validator 420 may determine whether the characteristics of each virtual disk (e.g., disk type, disk format, and capacity) match characteristics stored in one or more virtual disk profiles. Each virtual disk profile may, for example, be a record in a database, and the import manager may query the database to see if any records match the characteristics of the virtual disk.

If the characteristics of the virtual disks do not match those of virtual disk profiles, the validator may notify the orchestrator 410 regarding the error and halt the import process. The orchestrator may inform the customer that an error has occurred (e.g., virtual disks not supported).

If, however, the characteristics of the virtual disks do match those of disk profiles, validator 420 may notify orchestrator that the virtual disks are acceptable and provide their information (e.g., source, offset, length, and format). Orchestrator 410 may begin downloading the virtual disks. To download the virtual disks, orchestrator 410 may spawn convertor 430. Orchestrator 410 may pass along relevant information for the virtual disk (e.g., source, offset, length, format, etc.).

Convertor 430 may include a worker process that downloads the virtual disks beginning at an offset from the source location. The worker process may, for example, generate an HTTP range get to download the virtual disk. The virtual disk may arrive in one continuous stream or in chunks. Convertor may store the virtual disk in a storage volume (e.g., block storage). Once virtual disk 154 has been downloaded to the storage volume, convertor may modify the virtual disk to run inside the service provider network (e.g., by creating volumes from the block storage).

In particular implementations, orchestrator 410 may spawn a number of convertors 430, one for each of the virtual disks. Thus, the virtual disks may be downloaded in parallel.

Figure 5:
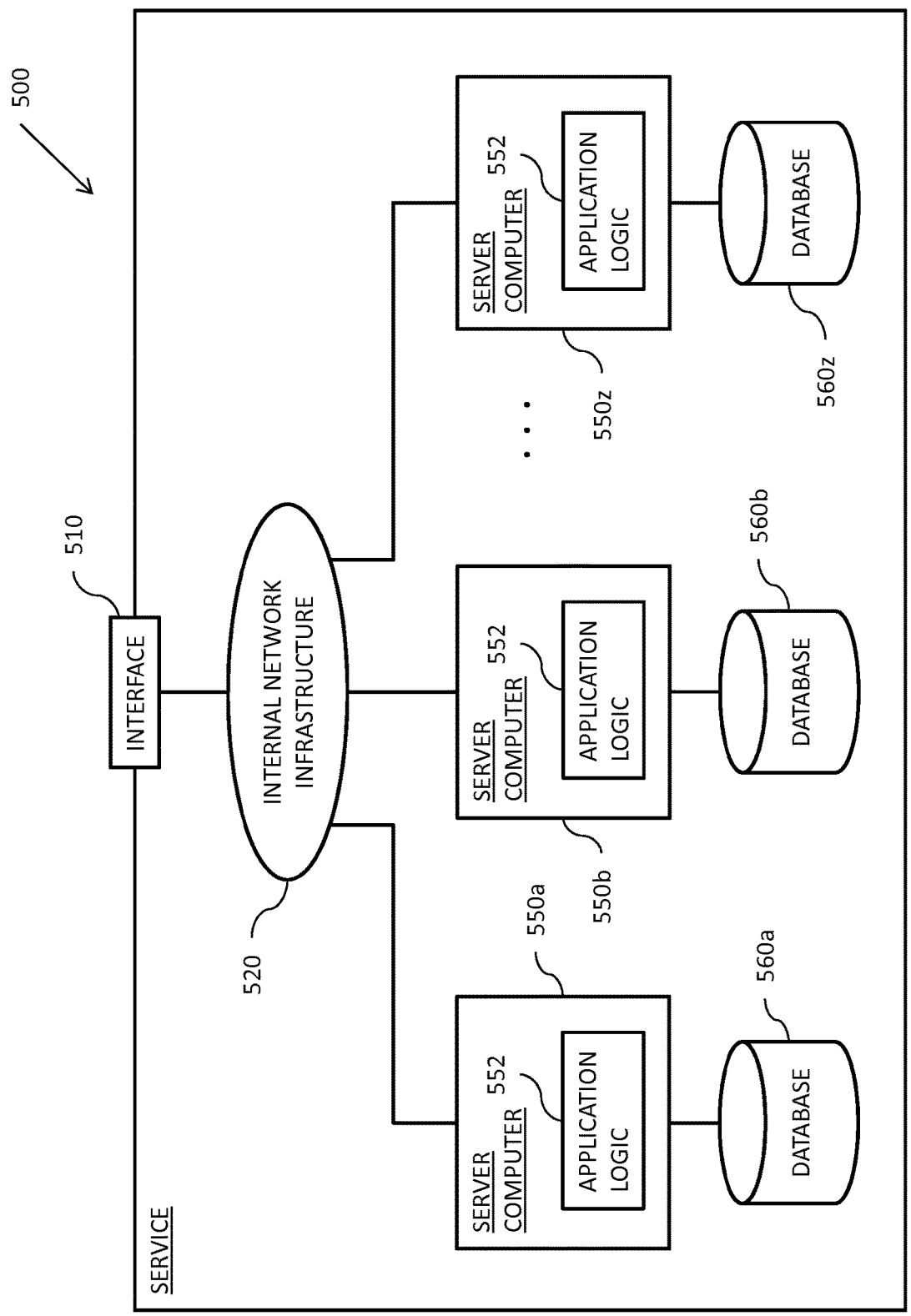
FIG. 5 is a block diagram illustrating selected components of an example web service for importing a virtual disk.

FIG. 5 illustrates selected components an example service 500. Service 500 may, for example, represent a service that manages import of virtual disks (e.g., import manager 132) or a part of a service that manages import of virtual disks (e.g., validator 420). In particular implementations, service 500 may be a web service.

Among other things, service 500 includes an interface 510 at which requests for the service may be received. Interface 510 may, for example, provide an application programming interface (API) to allow remote computer systems to submit requests. In one implementation, the functionality for submitting a request is provided by an API call through which a requestor (e.g., a customer) can specify a resource request. For instance, an example API call might allow remote computer systems to submit a request to import a virtual disk. Interface 510 could also provide a graphical user interface (GUI) to allow user to access service 500.

Service 500 also includes an infrastructure 520, to which interface 510 and other components of service 500 connect. Infrastructure 520 may, for example, be an intranet that is separate from an external communication network.

Also connected to network infrastructure 520 are a number of server computers 550. Each server computer 550 includes application logic 552 to execute the services provided by the service 500. The service provided by the service 500 may, for example, be basic informational technology services (e.g., processing, storage, etc.) or specific computational services (e.g., mapping, address management, etc.).

Coupled to server computers 550 are databases 560, which store the data required and generated by application logic 552. Databases 560 may be separate from each other or part of a larger database system and store the data required for using the service.

Service 500 may have an associated network endpoint (not picture), such as a load balancer, especially if the service is accessible over a public communication network (e.g., the Internet). A load balancer, for example, be responsible for distributing requests between server computers 550. In particular, a load balancer automatically distributes incoming application traffic across server computers 550, allowing greater fault tolerance and scalability.

Figure 6:
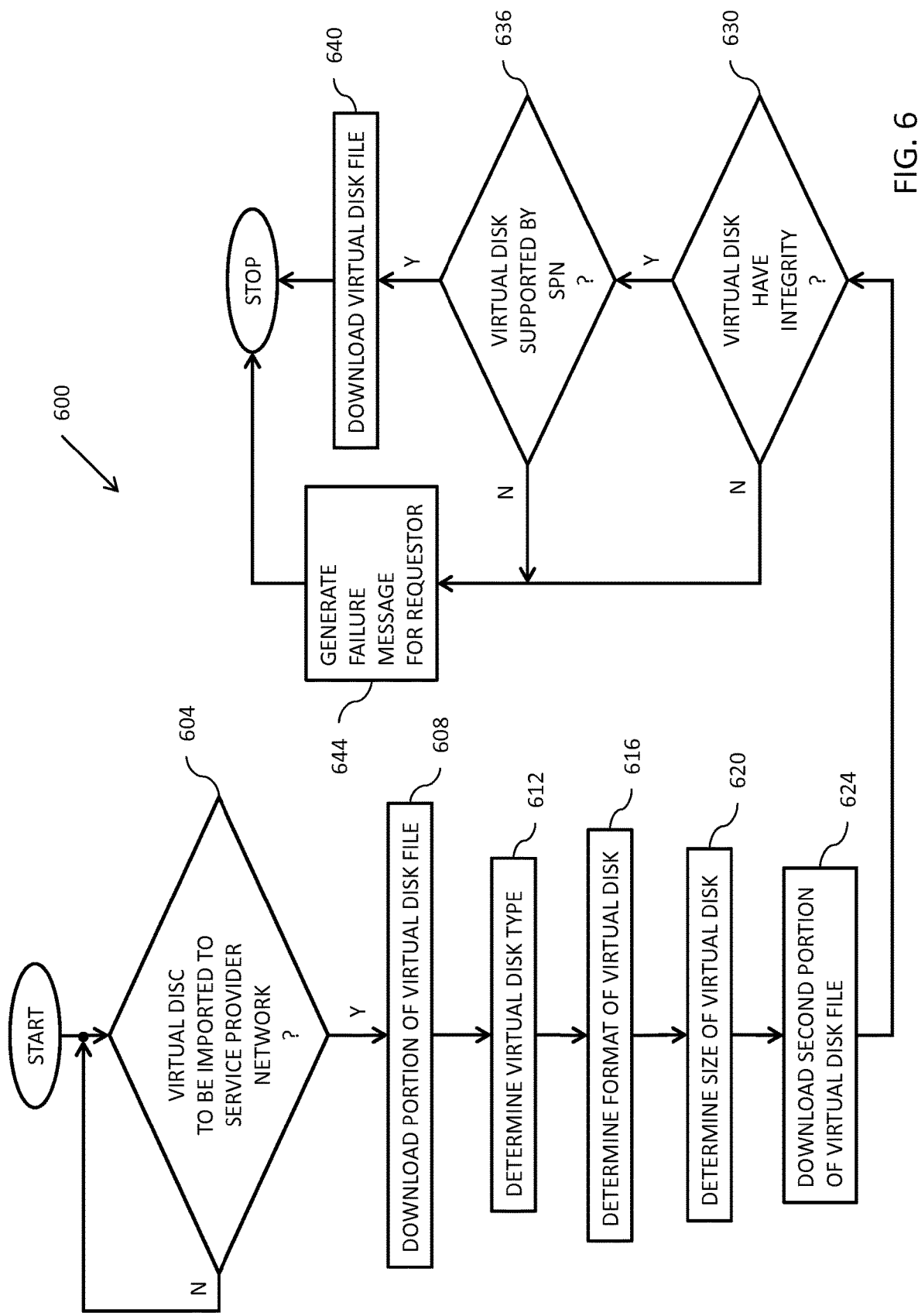
FIG. 6 is a flow diagram illustrating an example process for importing a virtual disk.

FIG. 6 illustrates an example process 600 for virtual disk importation. Process 600 may, for example, be implemented by a system similar to system 100.

Process 600 calls for determining whether a virtual disk is to be imported into a service provider network (operation 604). For example, in certain modes of operation, an import manager can be associated with an interface, such as a web service API. In an embodiment, virtual disk import requests from a customer can include an address (e.g., a URL) for the virtual disk to be imported, an identifier for the customer, and/or metadata about the virtual disk being imported. The message can be parsed, and the contents (e.g., address) can be stored in a data store. An import manager can include a worker process that checks the data store for new request messages and then processes them. If no import request for a virtual disk has been received, process 600 calls for waiting to receive such a request.

Once a request to import a virtual disk has been received, process 600 calls for downloading a portion of the virtual disk file (operation 608). For example, an import manager may spawn a validation process and inform it of the address of the virtual disk to be imported. The validation process may then send an HTTP range GET to download a portion of the virtual disk (e.g., to download the first 512 bytes).

In particular implementations, the validator can use range GET methods to attempt to retrieve the header of the virtual disk by using range GETs on certain byte ranges. The validator can check ranges of bytes where the header is to be expected for different formats the import manager supports. The validation process may then launch a worker process to parse the header to obtain desired information. For example, the worker process may try to locate various information regarding the virtual disk (e.g., magic number, capacity, and grain table).

Process 600 also calls for determining the virtual disk type (VMDK, VHD, or RAW) (operation 612). For example, the validation process may analyze the magic number for the virtual disk to determine what type of virtual disk is present. For instance, the validation process may determine whether a portion of the magic number matches a portion of a signature for a virtual disk.

In some implementations, if any of the data cannot be determined for the virtual disk, the validation process may select another way to analyze the virtual disk. For example, virtual disk signatures may be stored in a data store or in another file that is accessible to the validation process. The validation process may check this data store to determine which portions of a virtual disk to download for analysis (e.g., first 256 bytes, first 512 bytes, last 256 bytes, etc.). In certain implementations, the validation process may need to download different portions of a virtual disk in trying to determine what type of virtual disk a virtual disk is. For example, one type of virtual disk may have a header that is 256 bytes long with no offset, and another type of virtual disk may have a header that is 512 bytes long with an offset. As such, the import manager can be programmed to sequentially execute range GETs at different ranges and of different lengths until it obtains data that can be used.

The validation process may, for example, download a portion believed to be a header for a first virtual disk type and parse the header to find the magic number (e.g., by looking at a specific location or parsing an XML file). If an appropriate magic number is not found, the validation process may download another portion believed to be a header for a second virtual disk type and parse this header in attempt to find the magic number. If the validator finds a disk type that it recognizes, it may proceed with further processing, as discussed below. If the validation process does not recognize any virtual disk type, it may report back to the import manager regarding the failure and halt the import process. The import manager may then generate a message for the customer that describes the error.

Once the type of virtual disk has been determined, process 600 calls for determining the format of the virtual disk (operation 616) and the size of the virtual disk (operation 620). For example, the validation process may parse the header again to find the disk type (e.g., fixed versus sparse) and the capacity of the disk (when expanded).

Once the disk type and the capacity of the disk have been determined, process 600 calls for downloading a second portion of the virtual disk file (operation 624). For example, the validation process may download the footer for the virtual disk. The footer may, for example, be found by knowing the size of a fixed disk and reading the last portion of the disk (e.g., the last 512 bytes) since the footer comes at the end of the disk. For a sparse disk, the grain tables may be analyzed to determine where the footer resides.

Process 600 also calls for determining whether the virtual disk has integrity (operation 630). For example, using the footer, the validation process may determine whether the virtual disk has integrity (e.g., by comparing the footer to the header). If the virtual disk does not have integrity (e.g., it is corrupt), the import manager may notify the requestor regarding the failure and halt the import process (operation 644).

If the virtual disk has integrity, however, process 600 calls for determining whether the virtual disk is supported by the service provider network into which the virtual disk is to be imported (operation 636). For example, the validation process may determine whether the characteristics of the virtual disk (e.g., disk type, disk format, and capacity) match characteristics stored in one or more virtual disk profiles. Each virtual disk profile may, for example, be a record in a database, and the import manager may query the database to see if any records match the characteristics of the virtual disk.

If the characteristics of the virtual disk do not match those of any virtual disk profile, the validation process may notify the import manager. Process 600 calls for generating a failure message for the requester (operation 644) and halting the import process.

If, however, the virtual disk to be imported is supported by the service provider network, process 600 calls for downloading the virtual disk file (operation 640). For example, the import manager may begin downloading the virtual disk by spawning a convertor process and passing along relevant information for the virtual disk (e.g., source, offset, length, format, etc.).

Convertor process may include a worker process that downloads the virtual disk beginning at an offset from the source location. The worker process may, for example, generate an HTTP range get to download the virtual disk. The virtual disk may arrive in one continuous stream or in chunks. The convertor may store the virtual disk in a storage volume (e.g., block storage). Once the virtual disk has been downloaded to the storage volume, the convertor process may modify the virtual disk to run inside the service provider network (e.g., by creating volumes from the block storage).

Although FIG. 6 illustrates one example process for importing a virtual disk, other processes for importing a virtual disk may include fewer, additional, and/or a different arrangement of operations. For example, a process may include determining whether there are multiple virtual disks to be imported. As another example, a process may include readying the virtual disk for use in the service provider network and checking whether it functions properly. As an additional example, in some implementations, the second portion of the virtual disk file is not downloaded. As a further example, in some implementations the format of the virtual disk is not determined and/or the integrity of the virtual disk is not checked. As another example, a variety of other messages may be sent to the import requestor (e.g., cannot access virtual disk, cannot determine virtual disk type, cannot determine format of virtual disk, cannot determine size of virtual disk, etc.).

Figure 7:
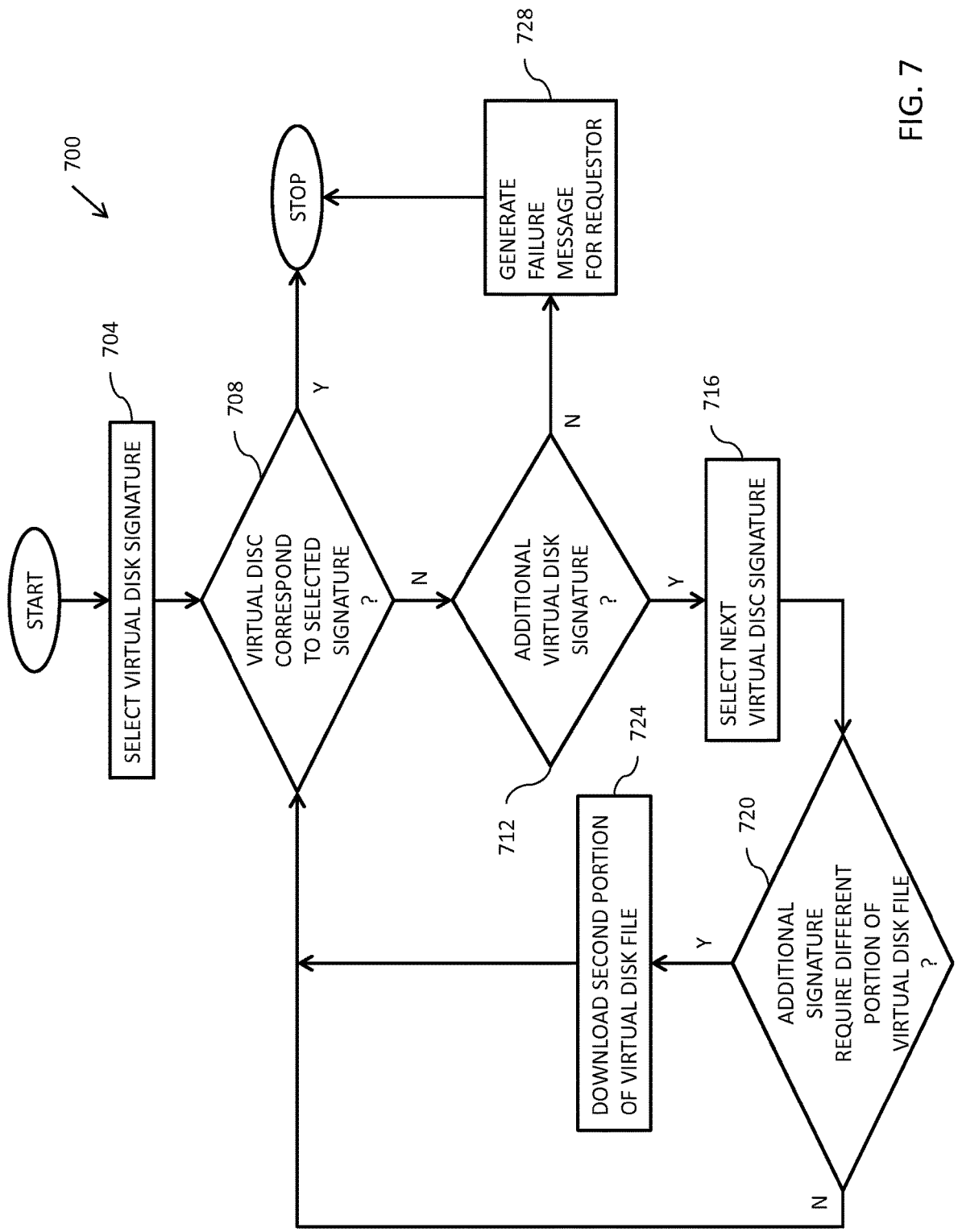
FIG. 7 is a flow diagram illustrating another example process for importing a virtual disk.

FIG. 7 illustrates an example process 700 for virtual disk importation. Process 700 may, for example, be implemented by a system similar to system 100. Process 700 may, for example, represent the procedures for operation 612 in process 600.

Process 700 calls for selecting a virtual disk signature (operation 704). For example, virtual disk signatures may be stored in a data store that is accessible to a validation process. The validation process may check this data store to determine which portions of a virtual disk to download for analysis (e.g., first 256 bytes, first 512 bytes, last 256 bytes, etc.). In certain implementations, the validation process may need to download different portions of a virtual disk in trying to determine what type of virtual disk a virtual disk is. For example, one type of virtual disk may have a header that is 256 bytes long with no offset, and another type of virtual disk may have a header that is 512 bytes long with an offset.

Process 700 also calls for determining whether the virtual disk to be imported corresponds to (e.g., matches) the selected virtual disk signature (operation 708). For example, a validation process may parse the header for a virtual disk to find the magic number (e.g., by looking at a specific location or parsing an XML file).

If the virtual disk matches a virtual disk signature, process 700 is at an end. If, however, the virtual disk does not match the selected virtual disk signature, process 700 calls for determining whether there is an additional virtual disk signature (operation 712). If there is an additional virtual disk signature, process 700 calls for selecting the next virtual disk signature (operation 716). Selecting the next virtual disk signature may, for example, be accomplished by selecting the next virtual disk signature in an ordered list.

Process 700 additionally calls for determining whether the additional virtual disk signature requires a different portion of the virtual disk file (operation 720). For example, one type of virtual disk may have a header that is 256 bytes long with no offset, and another type of virtual disk may have a header that is 512 bytes long with an offset. If the additional virtual disk signature does not require a different portion of the virtual disk file, process 700 calls for again evaluating whether the virtual disk corresponds to the selected virtual disk signature (operation 708).

If, however, the additional virtual disk signature requires a different portion of the virtual disk file, process 700 calls for downloading a second portion of the virtual disk file (operation 724). For example, a validation process may send a range get to the device hosting the virtual disk to download the appropriate portion. Once the appropriate portion of the virtual disk is downloaded, process 700 again calls for evaluating whether the virtual disk corresponds to the selected virtual disk signature (operation 708).

Process 700 calls for continuing to in an attempt to match a virtual disk to a virtual disk signature until there are no more virtual disk signatures to compare against (operation 712). If there are no more virtual disk signatures to compare against, process 700 calls for generating a failure message for the requester (operation 728). Such a message may, for example, indicate that the import process cannot determine the type of virtual disk. Process 700 is then at an end.

Figure 8:
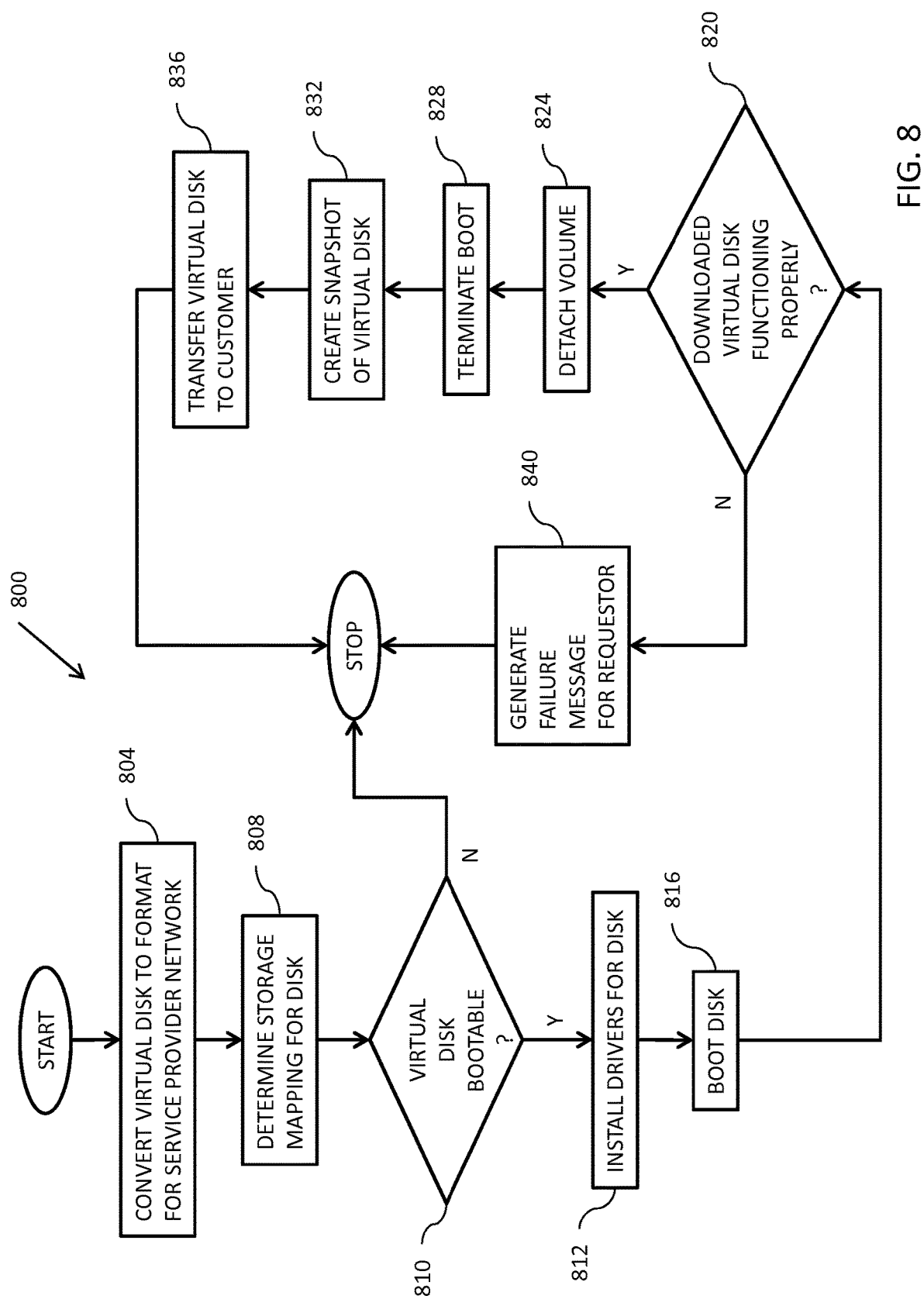
FIG. 8 is a flow diagram illustrating an example process for implementing an imported virtual disk.

FIG. 8 illustrates an example process 800 for implementing an imported virtual disk. Process 800 may, for example, be implemented by a system similar to system 100. Process 800 generally calls for preparing the imported virtual disk to run in the service provider network and making it ready for the customer's virtual machine.

Process 800 calls for converting the virtual disk to a format for the service provider network (operation 804). During download, the virtual disk may be stored on a block storage volume, for example. Thus, a volume may need to be created for the virtual disk. A convertor may, for instance, spawn a worker process to create the volume. Additionally, in some implementations, the format of the virtual disk may need to be changed (e.g., from VMDK to RAW) before the volume is created.

Process 800 also calls for determining storage mapping for the created volume (operation 808). For example, the created volume may be attached to a code injector. The code injector will then operate on the volume to perform injection. The code injector will understand the volumes and partitions and determine how the volumes will be attached in a boot instance and the customer's virtual machine configuration. As part of completing code injection, the injector instance will return the volume mapping back to the import manager. The import manager will use this information to setup a boot instance.

Process 800 additionally calls for determining whether the virtual disc is bootable (operation 810). A virtual disk may, for example, be bootable if it includes an operating system. A virtual disk may, for example, not be bootable if it just contains data. Determining whether a virtual disk is bootable may, for example, be accomplished by analyzing the disk's master boot record for the appropriate flag settings. If the virtual disk is not bootable, process 800 is at an end.

If, however, the virtual disk is bootable, process 800 also calls for installing drivers for the virtual disk (operation 812) and booting the disk (operation 816). For example, an import manager may call a boot manager with the volume attached with appropriate device mapping and start the instance. The boot manager instance will perform an installation phase where it installs a set of drivers and/or binaries. After the installation, the boot manager will reboot itself for the installed drivers and/or binaries to take effect.

After booting the disk, process 800 calls for determining whether the downloaded virtual disk is functioning properly (operation 820). The validation process may, for example, determine whether the booted disk has networking capability (e.g., it is possible to read and write to the disk). If the disk does not have networking connectivity, process 800 calls for generating a failure message for the requester (operation 840). Process 800 is then at an end.

If, however, the booted virtual disk has networking connectivity, process 800 calls for detaching the volume from the boot instance (operation 824) and terminating the boot instance (operation 828). The import manager may, for example, detect the networking connectivity and detach the volume and terminate the boot instance. Once that happens the import manager, will detach the volume and shut down the boot instance.

Process 800 then calls for creating a snapshot of the virtual disk (operation 832) and transferring the virtual disk to the customer (operation 836). Transferring the virtual disk to the customer may, for example, include changing the ownership of the virtual disk to the customer so that the customer can manage the virtual disk and/or copying the virtual disk to the customer's virtual machine. The virtual disk is now ready for the customer to use. Process 800 is at an end.

Figure 9:
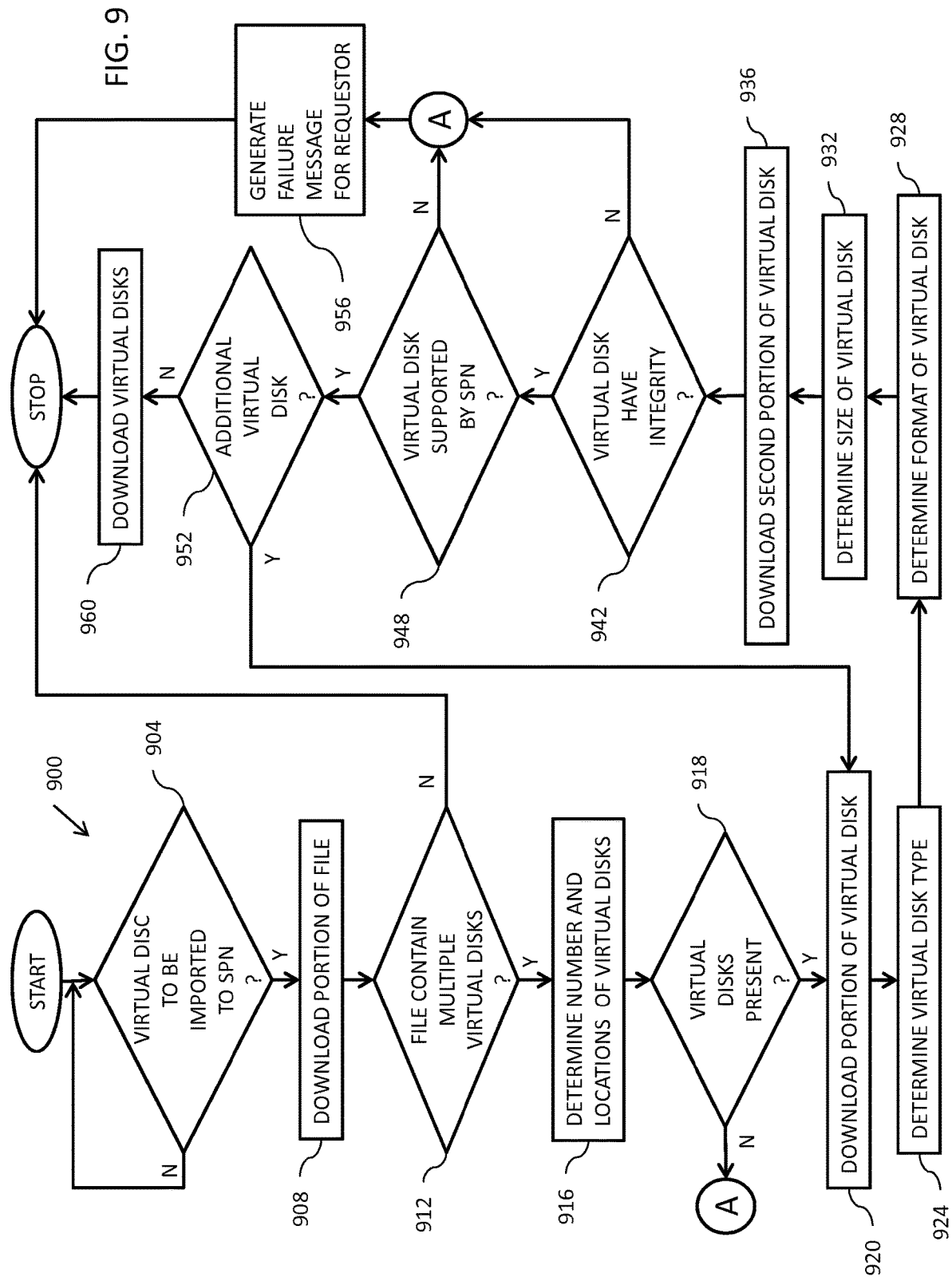
FIG. 9 is a flow diagram illustrating an example process importing multiple virtual disks.

FIG. 9 illustrates an example process 900 for importing multiple virtual disks. Process 900 may, for example, be implemented by a system similar to system 100. Process 900 generally calls determining whether multiple virtual disks are in a virtual disk file designated for import into a service provider network, checking whether each virtual disk is acceptable for import, and downloading the virtual disks if they are acceptable Process 900 calls for determining whether a virtual disk is to be imported into a service provider network (operation 904). For example, in certain modes of operation, an import manager can include an interface, such as a web service API. In an embodiment, virtual disk import requests from a customer can include an address (e.g., a URL) for a virtual disk to be imported. The message can be parsed and the contents (e.g., address) can be stored in a data store. The import manager can include a worker process that checks the data store for new request messages and then processes them. If no import request for a virtual disk has been received, process 900 calls for waiting to receive such a request.

Once a request to import a virtual disk has been received, process 900 calls for downloading a portion of a file containing the virtual disk (operation 908). For example, an import manager may spawn a validation process and inform it of the address of the virtual disk to be imported. The validation process may then send an HTTP range get to download a portion of the virtual disk (e.g., to download the first 512 bytes).

In particular implementations, the header of the virtual disk file may be downloaded. The header may, for example, by an OVF descriptor. The validation process may then launch a worker process to parse the header to obtain desired information.

Process 900 calls for determining whether the virtual disk file can contain multiple virtual disks (operation 912). Determining whether the virtual disk file can contain multiple virtual disks can, for example, be accomplished by searching for appropriate entries that identify the file is a descriptor file (e.g., "ovf:id").

If the virtual disk file cannot include multiple virtual disks, process 900 is at an end. A single virtual disk may be downloaded by a process similar to process 600.

If, however, the virtual disk file may contain multiple virtual disks, process 900 calls for determining the number of virtual disks in the virtual disk file and their locations (operation 916). To determine the number of virtual disks in a virtual disk file and their locations, an import manager may launch a worker process to parse the descriptor to obtain the desired information.

In particular implementations, the file reference part of an OVF descriptor and or the disk element part of the descriptor may be parsed. The file reference part provides a listing of all the files in the OVF package, including disks, and determines the integrity of an OVF package without having to parse or interpret the entire structure of the descriptor. The integrity of the OVF file may, for example, be determined by locating the listed disks in the file. For example, if all of the disks are present, the OVF file may pass the integrity check. If not all the virtual disks are present, the OVF file may fail the integrity check.

Each File element in the reference part is given an identifier using the ovf:id attribute, which is unique inside an OVF package. Each File element is also specified using the ovf:href attribute, which contains a URL. If no URL scheme is specified, the value of the ovf:href attribute may be interpreted as a path name of the referenced file relative to the location of the OVF descriptor itself. The size of the referenced file may be specified using the ovf:size attribute, which is expressed in bytes. If present, the value of the ovf:size attribute should match the actual size of the referenced file. An example OVF envelope was discussed previously, and also include a DiskSelection element.

The DiskSection element describes meta-information about the virtual disks in the OVF package. Each virtual disk represented by a Disk element is given an identifier using the ovf:diskId attribute. The capacity of a virtual disk is specified by the ovf:capacity attribute with an xs:long integer value, which is typically expressed in bytes. The ovf:fileRef attribute denotes the virtual disk content by identifying an existing File element in the References element. The File element is identified by matching its ovf:id attribute value with the ovf:fileRef attribute value. Disk elements are ordered such that they identify any File elements in the same order as these are defined in the References element. The format URI of a non-empty virtual disk is specified by the ovf:format attribute. For non-empty disks, the actually used size of the disk may be specified using the ovf:populatedSize attribute. OVF does not require any specific disk format to be used, but to comply with the specification, the disk format should be given by a URI that identifies an unencumbered specification on how to interpret the disk format. The URI may be used as a key in reading an OVF package to uniquely determine the format of the disk. An example DiskSection was discussed previously.

By parsing the DiskSection portion of the envelope, the validation process may determine the number of disks, along with their capacity and current size. By referencing to the FileSection from the disk section using the file Ref, the location of the associated disks may be determined (by URL or ovf:href).

Process 900 then calls for determining whether the virtual disks are present in the OVF package (operation 918). For example, the validation process spawn a worker process that iterates the archived files in the OVF package to locate these disks. If all the virtual disks are not found, process 900 calls for generating a failure message for the requester (operation 956). A failure will occur if all of the disks are not found as they may be needed for the virtual machine to boot properly. Process 900 is then at an end.

If, however, all of the virtual disks are present in the OVF package, process 900 calls for downloading a portion of a virtual disk in the virtual disk file (operation 922). For example, an import manager may spawn a validation process and inform it of the address of the virtual disk to be imported. The validation process may then send an HTTP range get to download a portion of the virtual disk (e.g., to download the first 512 bytes).

In particular implementations, the header of the virtual disk may be downloaded. The worker process may then parse the header to obtain desired information. For example, the worker process may try to locate various information regarding the virtual disk (e.g., magic number, capacity, and grain table).

Process 900 also calls for determining the virtual disk type (VMDK, VHD, or RAW) (operation 924). For example, the validation process may analyze the magic number for the virtual disk to determine what type of virtual disk is present. For instance, the validation process may determine whether a portion of the magic number matches a portion of a signature for a virtual disk.

In some implementations, if any of the data cannot be determined for the virtual disk, the validation process may select another way to analyze the virtual disk. For example, virtual disk signatures may be stored in a data store that is accessible to the validation process. The validation process may check this data store to determine which portions of a virtual disk to download for analysis (e.g., first 256 bytes, first 512 bytes, last 256 bytes, etc.). In certain implementations, the validation process may need to download different portions of a virtual disk in trying to determine what type of virtual disk a virtual disk is. For example, one type of virtual disk may have a header that is 256 bytes long with no offset, and another type of virtual disk may have a header that is 512 bytes long with an offset.

The validation process may, for example, download a portion believed to be a header for a first virtual disk type and parse the header to find the magic number (e.g., by looking at a specific location or parsing an XML file). If an appropriate magic number is not found, the validation process may download another portion believed to be a header for a second virtual disk type and parse this header in attempt to find the magic number. If the validation process finds a disk type that it recognizes, it may proceed with further processing, as discussed below. If the validation process does not recognize any virtual disk type, it may report back to the import manager regarding the failure and halt the import process. The import manager may then generate a message for the customer that describes the error (e.g., unrecognized disk).

Once the type of virtual disk has been determined, process 900 calls for determining the format of the virtual disk (operation 928) and the size of the virtual disk (operation 932). For example, the validation process may parse the header again to find the disk type (e.g., fixed versus sparse) and the capacity of the disk (when expanded).

Once the validation process has determined the disk type and the size of the disk, process 900 calls for downloading a second portion of the virtual disk file (operation 936). For example, the validation process may download the footer for the virtual disk. The footer may, for example, be found by knowing the size of a fixed disk and reading the last portion of the disk (e.g., the last 512 bytes) since the footer comes at the end of the disk. For a sparse disk, the grain tables may be analyzed to determine where the footer resides.

Process 900 additionally calls for determining whether the virtual disk has integrity (operation 942). For example, using the footer, the validation process may determine whether the virtual disk has integrity (e.g., by comparing the footer to the header). If the virtual disk does not have integrity (e.g., it is corrupt), the import manager may notify the requestor regarding the failure and halt the import process (operation 956).

If the virtual disk has integrity, however, process 900 calls for determining whether the virtual disk is supported by the service provider network into which the virtual disk is being imported (operation 948). For example, the validation process may compare the characteristics of the virtual disk (e.g., disk type, disk format, and capacity) to characteristics stored in one or more virtual disk profiles. Each virtual disk profile may, for example, be a record in a database, and the import manager may query the database to see if any records match the characteristics of the virtual disk.

If the characteristics of the virtual disk do not match those of any virtual disk profile, the validation process may notify the import manager. Process 900 calls for generating a failure message for the requester (operation 956) and stopping the import process.

If, however, the virtual disk to be imported is supported by the service provider network, process 900 calls for determining whether there is an additional virtual disk in the virtual disk file (operation 952). If there is an additional disk in the virtual disk file, process 900 calls for downloading a portion of the virtual disk file containing the virtual disk (operation 920) and performing the previously discussed analysis for this virtual disk.

If, however there is not an additional virtual disk in the virtual disk file, process 900 calls for downloading the virtual disks (operation 960). Process 900 is then at an end.

To download the virtual disks, an import manager may begin downloading the virtual disk by spawning a convertor process and passing along relevant information for the virtual disk (e.g., source, offset, length, format, etc.). The convertor process may include a worker process that downloads a virtual disk beginning at an offset from the source location. The worker process may, for example, generate an HTTP range get to download the virtual disk. The virtual disk may arrive in one continuous stream or in chunks. Convertor may store the virtual disk in a storage volume (e.g., block storage). Once the virtual disk has been downloaded to the storage volume, convertor may modify the virtual disk to run inside the service provider network (e.g., by creating volumes from the block storage). In particular implementations, multiple virtual disks may be downloaded at one time (e.g., by spawning multiple convertor processes).

Although FIG. 9 illustrates one example process for importing a virtual disk, other example processes for importing of virtual disk may include fewer, additional, and/or a different arrangement of operations. For example, a process may include readying the virtual disks for use in the service provider network and checking whether they function properly. As an additional example, in some implementations, the second portions of the virtual disk files are not downloaded. As another example, in some implementations, the formats of the virtual disks are not determined and/or the integrity of the virtual disks is not checked. As another example, a variety of other messages may be sent to the import requestor (e.g., cannot access virtual disks, cannot determine virtual disk types, cannot determine formats of virtual disks, cannot determine size of virtual disks, etc.).

Figure 10:
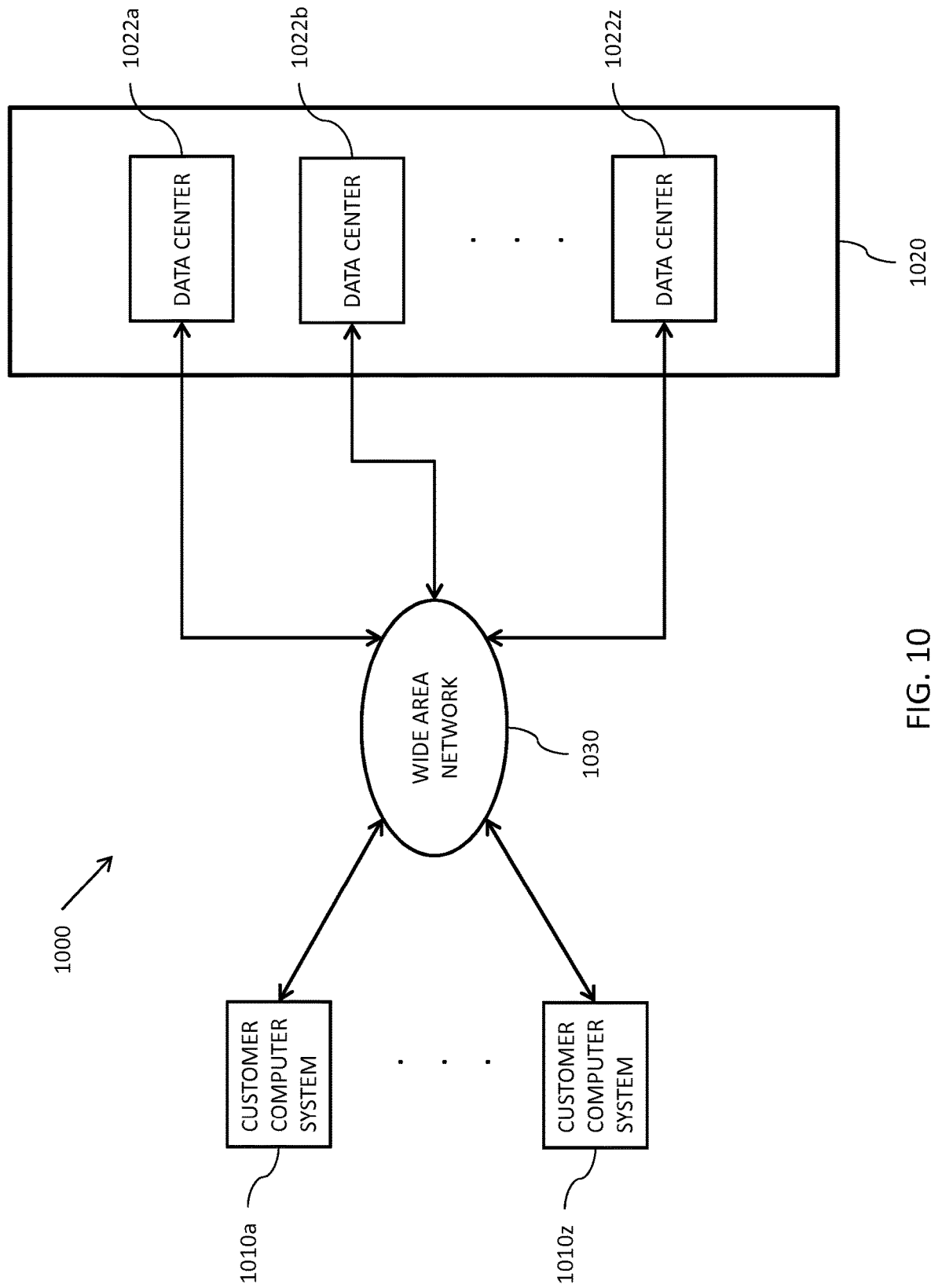
FIG. 10 is a block diagram illustrating selected components of an example system for importing virtual disks.
Figure 11:
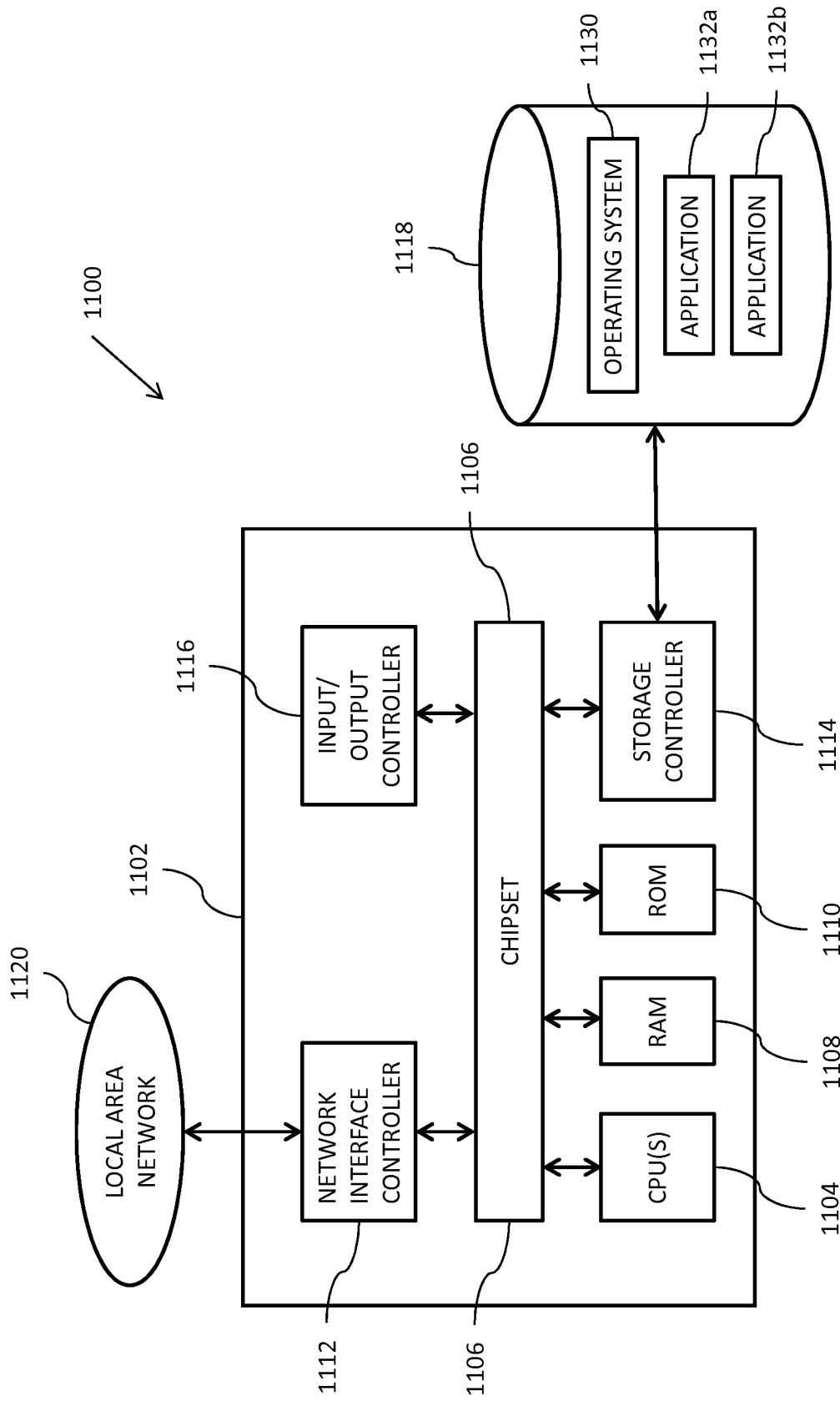
FIG. 11 is a block diagram illustrating selected components of an example computer system for importing virtual disks.

FIGS. 10-11 are similar to FIG. 1 in that they depict example operating environments in which embodiments disclosed herein may be implemented, and these figures depict these operating environments at varying levels of granularity. FIG. 10 generally depicts a web services platform 1020 that includes a plurality of datacenters 1022. FIG. 11 generally depicts a computer system 1100 that may be part of a larger system (e.g., a data center).

It may be appreciated that these operating environments of FIGS. 10-11 may be used to implement aspects of the operating environment of FIG. 1. For example, import manager 132 or server computers 140 may be implemented in a datacenter 1022 or across multiple datacenters 1022 of FIG. 10. Likewise, communication network 120 of FIG. 1 may be wide area network 1030 of FIG. 10, and customer computer systems 110 of FIG. 1 may be customer computer systems 1010 of FIG. 10.

FIG. 10 depicts an example system 1000 for managing dynamically assigned IP addresses. A cloud service provider (such as web services platform 1020) may configure the illustrated computing environment to host virtual clouds of entities and to enable communication paths between these virtual clouds that may otherwise be isolated. In particular, FIG. 10 is a system and network diagram that shows an illustrative operating system 1000 that includes a web services platform 1020, for implementing virtual clouds and for providing on-demand access to compute resources such as virtual machine instances. Web services platform 1020 can provide compute resources for executing applications on a permanent or an as-needed basis and may be configured as a private network. These compute resources may include various types of resources such as data processing resources, data storage resources, data communication resources and the like. Each type of compute resource may be general-purpose or may be available in a number of specific configurations. For example, data processing resources may be available as virtual machine instances. The instances may be configured to execute applications, including Web servers, application servers, media servers, database servers and the like. Data storage resources may include file storage devices, block storage devices and the like.

Each type or configuration of compute resource may be available in different sizes, such as large resources consisting of many processors, large amounts of memory and/or large storage capacity and small resources consisting of fewer processors, smaller amounts of memory and/or smaller storage capacity. Entities may choose to allocate a number of small processing resources as Web servers and/or one large processing resource as a database server, for example.

The compute resources provided by web services platform 1020 may be enabled by one or more datacenters 1022, which may be referred herein singularly as "datacenter 1022" or in the plural as "datacenters 1022." Datacenters 1022 may be facilities that house and operate computer systems and associated components and may include redundant and backup power, communications, cooling and security systems. Datacenters 1022 may be located in a same geographical area, such as in a same facility and may be interconnected using private networks, such as high-speed fiber optic networks, controlled and managed by a service provider of web services platform 1020. Datacenters 1022 may also be distributed across geographically disparate locations and may be interconnected in part using public networks such as the Internet.

Entities of web services platform 1020 may access the compute resources provided by datacenters 1022 over a wide-area network ("WAN") 1030. Although a WAN is illustrated in FIG. 10, it should be appreciated that a local-area network ("LAN"), the Internet or any other networking topology known in the art that connects datacenters 1022 to remote entities and other users may be utilized. It should also be appreciated that combinations of such networks may also be utilized.

An entity or other entities that are customers of web services platform 1020 may utilize a computer system 810 to access the compute resources provided by datacenters 1022. Customer computer system 810 comprises a computer capable of accessing web services platform 1020, such as a server computer, a desktop or laptop personal computer, a tablet computer, a wireless telephone, a PDA, an e-reader, a game console, a set-top box or any other computing node.

As is described in greater detail above, customer computer systems 1010 may be utilized to configure aspects of the compute resources provided by web services platform 1020. In this regard, web services platform 1020 may provide a Web interface through which aspects of its operation may be configured through the use of a Web browser application program executing on customer computing system 810. Alternatively, a stand-alone application program executing on customer computing system 810 may access an application programming interface ("API") exposed by web services platform 1020 for performing the configuration operations. Other mechanisms for configuring the operation of web services platform 1020, including launching new virtual machine instances on web services platform 1020, may also be utilized.

According to embodiments disclosed herein, capacities of purchased compute resources provided by web services platform 1020 can be scaled in response to demand. In this regard, scaling refers to the process of instantiating, which may also be referred to herein as "launching" or "creating," or terminating, which may also be referred to herein as "de-scaling," instances of compute resources in response to demand.

Auto scaling may be one mechanism for scaling compute resources in response to increases or lulls in demand for the resources. Auto scaling may allow entities of web services platform 1020 to scale their purchased compute resources according to conditions defined by the entity. For instance, rules may be defined for scaling up capacity in a particular manner in response to the occurrence of specified conditions, such as a spike in demand. Similarly, rules may also be defined to scale down capacity in a particular manner in response to the occurrence of other conditions, such as a lull in demand. The mechanisms disclosed herein for launching virtual machine instances may be utilized when instances are manually launched by an entity or when instances are launched by an auto scaling component in web services platform 1020.

Web services platform 1020 may also be configured with a deployment component to assist entities in the deployment of new instances of compute resources. The deployment component may receive a configuration from an entity that may include data describing how new instances should be configured. For example, the configuration may specify one or more applications or software components that should be installed in new instances, provide scripts and/or other types of code to be executed in new instances, provide cache warming logic specifying how an application cache should be prepared and other types of information. The deployment component utilizes the entity-provided configuration and cache warming logic to launch, configure and prime new instances of compute resources.

FIG. 11 depicts an example computer system 1100 capable of executing the above-described software components. With regard to the example system described with respect to FIG. 1 and FIG. 5, the server computers and the customer computer systems 110 may each be implemented by as a computer system 1100.

The computer architecture shown in FIG. 11 illustrates a conventional server computer, workstation, desktop computer, laptop, tablet, network appliance, PDA, e-reader, digital cellular phone or other computing node, and may be utilized to execute any aspects of the software components presented herein described as executing within datacenters 1022, on server computers 140, on the customer computer systems 110 or on any other computing system mentioned herein.

Computer system 1100 may include a baseboard, or "motherboard," which is a printed circuit board to which a multitude of components or devices may be connected by way of a system bus or other electrical communication paths. One or more central processing units ("CPUs") 1104 may operate in conjunction with a chipset 1106. CPUs 1104 may be standard programmable processors that perform arithmetic and logical operations necessary for the operation of computer system 1100.

CPUs 1104 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

Chipset 1106 may provide an interface between CPUs 1104 and the remainder of the components and devices on the baseboard. Chipset 1106 may provide an interface to a random access memory ("RAM") 1108 used as the main memory in computer system 1100. Chipset 1106 may further provide an interface to a computer-readable storage medium such as a read-only memory ("ROM") 1110 or non-volatile RAM ("NVRAM") for storing basic routines that may help to start up computer system 1100 and to transfer information between the various components and devices. ROM 1110 or NVRAM may also store other software components necessary for the operation of computer system 1100 in accordance with the embodiments described herein.

Computer system 1100 may operate in a networked environment using logical connections to remote computing nodes and computer systems through network 1120. Chipset 1106 may include functionality for providing network connectivity through a network interface controller ("NIC") 1112, such as a gigabit Ethernet adapter. NIC 1112 may be capable of connecting the computer system 1100 to other computing nodes over network 1120. It should be appreciated that multiple NICs 1112 may be present in computer system 1100, connecting the computer to other types of networks and remote computer systems.

Computer system 1100 may be connected to a mass storage device 1118 that provides non-volatile storage for the computer. Mass storage device 1118 may store system programs, application programs, other program modules and data which have been described in greater detail herein. Mass storage device 1118 may be connected to computer system 1100 through a storage controller 1124 connected to chipset 1106. Mass storage device 1118 may consist of one or more physical storage units. Storage controller 1124 may interface with the physical storage units through a serial attached SCSI ("SAS") interface, a serial advanced technology attachment ("SATA") interface, a fiber channel ("FC") interface or other type of interface for physically connecting and transferring data between computers and physical storage units.

Computer system 1100 may store data on mass storage device 1118 by transforming the physical state of the physical storage units to reflect the information being stored. The specific transformation of a physical state may depend on various factors and on different implementations of this description. Examples of such factors may include, but are not limited to, the technology used to implement the physical storage units and whether mass storage device 1118 is characterized as primary or secondary storage and the like.

For example, computer system 1100 may store information to mass storage device 1118 by issuing instructions through storage controller 1114 to alter the magnetic characteristics of a particular location within a magnetic disk drive unit, the reflective or refractive characteristics of a particular location in an optical storage unit or the electrical characteristics of a particular capacitor, transistor or other discrete component in a solid-state storage unit. Other transformations of physical media are possible without departing from the scope and spirit of the present description, with the foregoing examples provided only to facilitate this description. Computer system 1100 may further read information from mass storage device 1118 by detecting the physical states or characteristics of one or more particular locations within the physical storage units.

In addition to mass storage device 1118 described above, computer system 1100 may have access to other computer-readable storage media to store and retrieve information, such as program modules, data structures or other data. It should be appreciated by those skilled in the art that computer-readable storage media can be any available media that provides for the storage of non-transitory data and that may be accessed by computer system 1100.

By way of example and not limitation, computer-readable storage media may include volatile and non-volatile, transitory and non-transitory, removable and non-removable media implemented in any method or technology. Computer-readable storage media includes but is not limited to, RAM, ROM, erasable programmable ROM ("EPROM"), electrically-erasable programmable ROM ("EEPROM"), flash memory or other solid-state memory technology, compact disk ROM ("CD-ROM"), digital versatile disk ("DVD"), high definition DVD ("HD-DVD"), BLU-RAY or other optical storage, magnetic cassettes, magnetic tape, magnetic disk storage, other magnetic storage devices or any other medium that can be used to store the desired information in a non-transitory fashion.

Mass storage device 1118 may store an operating system utilized to control the operation of the computer system 1100. According to one embodiment, the operating system comprises a version of the LINUX operating system. According to another embodiment, the operating system comprises a version of the WINDOWS® SERVER operating system from the MICROSOFT Corporation. According to further embodiments, the operating system may comprise a version of the UNIX operating system. It should be appreciated that other operating systems may also be utilized. Mass storage device 1118 may store other system or application programs and data utilized by computer system 1100, such as import manager 132, and/or the other software components described above.

Mass storage device 1118 or other computer-readable storage media may also be encoded with computer-executable instructions, which, when loaded into computer system 1100, transforms the computer from a general-purpose computing system into a special-purpose computer capable of implementing the embodiments described herein. These computer-executable instructions transform computer system 1100 by specifying how CPUs 1104 transition between states, as described above. Computer system 1100 may have access to computer-readable storage media storing computer-executable instructions, which, when executed by computer system 1100, may perform operating procedures depicted in FIGS. 2-7.

Computer system 1100 may also include an input/output controller 1116 for receiving and processing input from a number of input devices, such as a keyboard, a mouse, a touchpad, a touch screen, an electronic stylus or other type of input device. Similarly, input/output controller 1116 may provide output to a display, such as a computer monitor, a flat-panel display, a digital projector, a printer, a plotter or other type of output device. It will be appreciated that computer system 1100 may not include all of the components shown in FIG. 11, may include other components that are not explicitly shown in FIG. 11 or may utilize an architecture completely different than that shown in FIG. 11.

As described herein, a computing node may be a physical computing node, such as computer system 1100 of FIG. 11. A computing node may also be a virtual computing node, such as a virtual machine instance, or a session hosted by a physical computing node, where the computing node is configured to host one or more sessions concurrently.

It should be appreciated that the network topologies illustrated in the figures have been greatly simplified and that many more networks and networking devices may be utilized to interconnect the various computing systems disclosed herein. These network topologies and devices should be apparent to those skilled in the art.

It should also be appreciated that the systems in the figures are merely illustrative and that other implementations might be used. Additionally, it should be appreciated that the functionality disclosed herein might be implemented in software, hardware or a combination of software and hardware. Other implementations should be apparent to those skilled in the art. It should also be appreciated that a server, gateway or other computing node may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Each of the operations, processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disk and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms, furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A non-transitory computer-readable storage medium comprising computer-executable instructions stored thereupon that, as a result of being executed by a computer system, cause the computer system to:
   receive a request from a customer of a service provider network, which includes a number of server computers hosting virtual machines, to import a virtual disk into the service provider network, the virtual disk being accessible by the service provider network through a wide-area communication network that is external to the service provider network;
   download a header of a virtual disk file corresponding to the virtual disk through the communication network;
   determine a type of the virtual disk by analyzing the downloaded header for characteristics that correspond to predetermined signatures for virtual disks and as a result of the characteristics failing to match the predetermined signatures, download a different portion of the virtual disk for analysis of the type of the virtual disk;
   download a footer of the virtual disk file through the communication network;
   perform an integrity check on the virtual disk by comparing at least a portion of the header with at least a portion of the footer;
   determine whether the virtual disk is supported by the service provider network based on the type of the virtual disk; and
   download the virtual disk through the communication network based at least in part on the virtual disk passing the integrity check and being supported by the service provider network.

2. The computer readable storage medium of claim 1, comprising further computer-executable instructions stored thereupon which, as a result of being executed by a computer system, cause the computer system to:
   convert the virtual disk to a format for the service provider network;
   determine whether the virtual disk is bootable;
   boot the virtual disk if the virtual disk is bootable;
   determine that the virtual disk is functioning properly; and
   transfer the virtual disk to the customer if the virtual disk is functioning properly.

3. The computer readable storage medium of claim 1, comprising further computer-executable instructions stored thereupon which, as a result of being executed by a computer system, cause the computer system to:
   determine that the virtual disk file has a number of virtual disks therein based on the downloaded header;
   download a portion of each virtual disk, the portion of each virtual disk being smaller than each of the respective virtual disks;
   determine virtual disk types by analyzing the downloaded portion of each virtual disk for characteristics that correspond to predetermined signatures for virtual disks;
   determine whether the virtual disks are supported by the service provider network based on the virtual disk types; and
   download the virtual disks through the communication network if the virtual disks are supported by the service provider network.

4. A method, comprising:
   determining whether there is a virtual disk to be imported into a service provider network, the virtual disk being accessible by the service provider network through a communication network that is external to the service provider network;
   downloading a header of a virtual disk file corresponding to the virtual disk through the communication network;
   determining a type of the virtual disk by analyzing the downloaded header by at least comparing the header of the virtual disk file with a virtual disk signature and in response to the header of the virtual disk file and the virtual disk signature failing to match, downloading an additional portion of the virtual disk file for analysis of the type of the virtual disk;
   performing an integrity check on the virtual disk by comparing a portion of a footer of the virtual disk, that has been downloaded, with a portion of the header;
   determining whether the virtual disk is supported by the service provider network based on the determined type of the virtual disk; and
   downloading the virtual disk through the communication network based at least in part on the virtual disk passing the integrity check and being supported by the service provider network.

5. The method of claim 4, further comprising generating a notification for a customer of the service provider network if the virtual disk is not supported by the service provider network.

6. The method of claim 4, further comprising determining a format of the virtual disk by analyzing the downloaded header, wherein determining whether the virtual disk is supported by the service provider network is also based on the format of the virtual disk.

7. The method of claim 4, further comprising generating a notification for a customer of the service provider network if the virtual disk does not pass the integrity check.

8. The method of claim 4, further comprising:
   determining that the downloaded virtual disk is functioning properly; and
   transferring the virtual disk to a customer of the service provider network if the virtual disk is functioning properly.

9. The method of claim 8, wherein determining that the downloaded virtual disk is functioning properly comprises:
   converting the virtual disk to a format for the service provider network;
   determining whether the virtual disk is bootable; and
   booting the virtual disk if the virtual disk is bootable.

10. The method of claim 4, further comprising:
    determining that the virtual disk file has a number of virtual disks therein based on the downloaded header;
    downloading a portion of each virtual disk;

determining types of the virtual disks by analyzing the downloaded portion of each virtual disk for characteristics that correspond to predetermined signatures for virtual disks;

determining whether the virtual disks are supported by the service provider network based on the types of the virtual disks; and downloading the virtual disks through the communication network if the virtual disks are supported by the service provider network.

11. The method of claim 10, further comprising:

downloading a footer of each virtual disk through the communication network;

performing integrity checks on the virtual disks based on the footer of each virtual disk; and downloading the virtual disks through the communication network if the virtual disks pass the integrity checks.

12. A system, comprising:

one or more computing devices comprising processing units and memory, the one or more computing devices configured to:

determine whether there is a virtual disk to be imported into a service provider network, the virtual disk being accessible by the service provider network through a communication network that is external to the service provider network;

download a header of a virtual disk file corresponding to the virtual disk through the communication network;

determine a type of the virtual disk by analyzing the downloaded header by at least comparing the downloaded header with a virtual disk signature and as a result of the downloaded header and the virtual disk signature failing to match, download an additional portion of the virtual disk file for analysis of the type of the virtual disk;

perform an integrity check on the virtual disk by comparing a portion of a downloaded footer with a portion of the header;

determine whether the virtual disk is supported by the service provider network based on the determined type of the virtual disk; and download the virtual disk through the communication network based at least in part on the virtual disk passing the integrity check and being supported by the service provider network.

13. The system of claim 12, wherein the one or more computing devices are further configured to generate a notification for a customer of the service provider network if the virtual disk is not supported by the service provider network.

14. The system of claim 12, wherein the one or more computing devices are further configured to determine a format of the virtual disk by analyzing the downloaded header, wherein determining whether the virtual disk is supported by the service provider network is also based on the format of the virtual disk.

15. The system of claim 12, wherein the one or more computing devices are further configured to generate a notification for a customer of the service provider network if the virtual disk does not pass the integrity check.

16. The system of claim 12, wherein the one or more computing devices are further configured to:

determine that the downloaded virtual disk is functioning properly; and transfer the virtual disk to a customer of the service provider network if the virtual disk is functioning properly.

17. The system of claim 16, wherein to determine that the downloaded virtual disk is functioning properly, the one or more computing devices are further configured to:

convert the virtual disk to a format for the service provider network;

determine whether the virtual disk is bootable; and boot the virtual disk if the virtual disk is bootable.

18. The system of claim 12, wherein the one or more computing devices are further configured to:

determine that the file corresponding to the virtual disk has a number of virtual disks therein;

download a portion of each virtual disk;

determine types of the virtual disks by analyzing the downloaded portion of each virtual disk for characteristics that correspond to predetermined signatures for virtual disks;

determine whether the virtual disks are supported by the service provider network based on the types of the virtual disks; and download the virtual disks through the communication network if the virtual disks are supported by the service provider network.

19. The system of claim 18, wherein the one or more computing devices are further configured to:

download a footer of each virtual disk through the communication network;

perform integrity checks on the virtual disks based on the footer of each virtual disk; and download the virtual disks if the virtual disks pass the integrity checks.

20. The non-transitory computer-readable storage medium of claim 1, wherein the virtual disk is part of a plurality virtual disks stored in an Open Virtualization Format (OVF) package.

21. The non-transitory computer-readable storage medium of claim 20, comprising further computer-executable instructions stored thereupon which, as a result of being executed by a computer system, further cause the computer system to download the entire OVF package if the virtual disk passes the integrity check and is supported by the service provider network.

22. The non-transitory computer-readable storage medium of claim 1, wherein the type of the virtual disk is determined by analyzing the downloaded header for characteristics that correspond to a magic number that matches a portion of a signature for the virtual disk.

* * * * *